US008042732B2

(12) United States Patent
Blake et al.

(10) Patent No.: US 8,042,732 B2
(45) Date of Patent: Oct. 25, 2011

(54) SELF SERVICE COIN REDEMPTION CARD PRINTER-DISPENSER

(75) Inventors: John R. Blake, St. Charles, IL (US); Curtis W. Hallowell, Palatine, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 197 days.

(21) Appl. No.: 12/410,623

(22) Filed: Mar. 25, 2009

(65) Prior Publication Data

US 2010/0038419 A1 Feb. 18, 2010

Related U.S. Application Data

(60) Provisional application No. 61/039,264, filed on Mar. 25, 2008.

(51) Int. Cl.
*G06F 17/00* (2006.01)

(52) U.S. Cl. ........................................ 235/375; 235/379

(58) Field of Classification Search .................. 235/375, 235/379
See application file for complete search history.

(56) References Cited

U.S. PATENT DOCUMENTS 2,570,920 A 10/1951 Clough et al.
2,669,998 A 2/1954 Buchholz
2,750,949 A 6/1956 Kulo et al.
2,835,260 A 5/1958 Buchholz
2,865,561 A 12/1958 Rosapepe
3,132,654 A 5/1964 Adams
3,778,595 A 12/1973 Hatanaka et al.
3,916,922 A 11/1975 Prumm
3,998,237 A 12/1976 Kressin
3,998,376 A 12/1976 Haines ............................ 229/33
4,050,218 A 9/1977 Call ................................ 53/167
4,059,122 A 11/1977 Kinoshita (Continued)

FOREIGN PATENT DOCUMENTS

CA 2 235 925 11/1995

(Continued)

OTHER PUBLICATIONS

International Search Report corresponding to co-pending International Patent Application U.S. Appl. No. GB0905154.1, Great Britain, dated Jun. 29, 2009; 2 pp.

(Continued)

*Primary Examiner* — Daniel Hess
*Assistant Examiner* — Rafferty Kelly
(74) *Attorney, Agent, or Firm* — Nixon Peabody LLP

(57) ABSTRACT

A method of transferring funds to a personalized portable storage medium using a kiosk, includes the acts of receiving funds comprising a batch of loose mixed coins in a coin receiving area of the kiosk, processing the coins in a coin processing module, determining a total value of the funds using a controller, displaying the total value of the funds to a user of the kiosk, and permitting the user to select a desired graphic from amongst a plurality of available graphic selections using via a user input device. The method also includes the acts of printing, using a printing device, the user-selected graphic on a portable storage medium print area, the portable storage medium comprising a storage medium bearing data to which a value relating to the total value is associated and dispensing the portable storage medium bearing the user-selected graphic to the user, the portable storage medium having a first value relating to the total value.

29 Claims, 8 Drawing Sheets

U.S. PATENT DOCUMENTS

| | | | | |
|---|---|---|---|---|
| 4,075,460 | A | 2/1978 | Gorgens | |
| 4,150,740 | A | 4/1979 | Douno | |
| 4,166,945 | A | 9/1979 | Inoyama et al. | |
| 4,172,462 | A | 10/1979 | Uchida et al. | |
| 4,179,685 | A | 12/1979 | O'Maley | |
| 4,179,723 | A | 12/1979 | Spencer | |
| 4,197,986 | A | 4/1980 | Nagata | |
| 4,208,549 | A | 6/1980 | Polillo et al. | |
| 4,232,295 | A | 11/1980 | McConnell | |
| 4,234,003 | A | 11/1980 | Ristvedt et al. | 133/3 |
| 4,249,552 | A | 2/1981 | Margolin et al. | |
| 4,251,867 | A | 2/1981 | Uchida et al. | |
| 4,286,703 | A | 9/1981 | Schuller et al. | |
| RE30,773 | E | 10/1981 | Glaser et al. | |
| 4,310,885 | A | 1/1982 | Azcua et al. | |
| 4,317,957 | A | 3/1982 | Sendrow | |
| 4,341,951 | A | 7/1982 | Benton | |
| 4,355,369 | A | 10/1982 | Garvin | |
| 4,360,034 | A | 11/1982 | Davila et al. | |
| 4,369,442 | A | 1/1983 | Werth et al. | |
| 4,380,316 | A | 4/1983 | Glinka et al. | |
| 4,383,540 | A | 5/1983 | DeMeyer et al. | |
| 4,385,285 | A | 5/1983 | Horst et al. | |
| 4,412,292 | A | 10/1983 | Sedam et al. | |
| 4,416,299 | A | 11/1983 | Bergman | |
| 4,417,136 | A | 11/1983 | Rushby et al. | |
| 4,423,316 | A | 12/1983 | Sano et al. | |
| 4,434,359 | A | 2/1984 | Watanabe | |
| 4,454,414 | A | 6/1984 | Benton | |
| 4,531,531 | A | 7/1985 | Johnson et al. | 133/3 |
| 4,543,969 | A | 10/1985 | Rasmussen | 133/3 |
| 4,549,561 | A | 10/1985 | Johnson et al. | 133/3 |
| 4,556,140 | A | 12/1985 | Okada | |
| 4,558,711 | A | 12/1985 | Yoshiaki et al. | |
| 4,564,036 | A | 1/1986 | Ristvedt | 133/3 |
| 4,570,655 | A | 2/1986 | Raterman | 133/3 |
| 4,594,664 | A | 6/1986 | Hashimoto | |
| 4,602,332 | A | 7/1986 | Hirose et al. | |
| 4,620,559 | A | 11/1986 | Childers et al. | |
| 4,641,239 | A | 2/1987 | Takesako | |
| 4,674,260 | A | 6/1987 | Rasmussen et al. | 53/212 |
| 4,681,128 | A | 7/1987 | Ristvedt et al. | 453/6 |
| 4,718,218 | A | 1/1988 | Ristvedt | 53/532 |
| 4,731,043 | A | 3/1988 | Ristvedt et al. | 453/6 |
| 4,733,765 | A | 3/1988 | Watanabe | |
| 4,765,464 | A | 8/1988 | Ristvedt | 206/82 |
| 4,766,548 | A | 8/1988 | Cedrone et al. | |
| 4,775,353 | A | 10/1988 | Childers et al. | |
| 4,775,354 | A | 10/1988 | Rasmussen et al. | 453/10 |
| 4,778,983 | A | 10/1988 | Ushikubo | |
| 4,803,347 | A | 2/1989 | Sugahara et al. | |
| 4,804,830 | A | 2/1989 | Miyagisima et al. | |
| 4,812,629 | A | 3/1989 | O'Neil et al. | |
| 4,839,505 | A | 6/1989 | Bradt et al. | |
| 4,844,369 | A | 7/1989 | Kanayachi | |
| 4,863,414 | A | 9/1989 | Ristvedt et al. | 453/6 |
| 4,883,158 | A | 11/1989 | Kobayashi et al. | |
| 4,884,212 | A | 11/1989 | Stutsman | |
| 4,900,909 | A | 2/1990 | Nagashima et al. | |
| 4,908,516 | A | 3/1990 | West | |
| 4,921,463 | A | 5/1990 | Primdahl et al. | 453/3 |
| 4,953,086 | A | 8/1990 | Fukatsu | |
| 4,954,697 | A | 9/1990 | Kokubun et al. | |
| 4,964,495 | A | 10/1990 | Rasmussen | 194/344 |
| 4,966,570 | A | 10/1990 | Ristvedt et al. | 453/6 |
| 4,970,655 | A | 11/1990 | Winn et al. | |
| 4,988,849 | A | 1/1991 | Sasaki et al. | |
| 4,992,647 | A | 2/1991 | Konishi et al. | |
| 4,995,848 | A | 2/1991 | Goh | |
| 5,009,627 | A | 4/1991 | Rasmussen | 453/10 |
| 5,010,238 | A | 4/1991 | Kadono et al. | |
| 5,010,485 | A | 4/1991 | Bigari | |
| 5,011,455 | A | 4/1991 | Rasmussen | 453/10 |
| 5,022,889 | A | 6/1991 | Ristvedt et al. | 453/6 |
| 5,025,139 | A | 6/1991 | Halliburton, Jr. | |
| 5,026,320 | A | 6/1991 | Rasmussen | 453/6 |
| 5,031,098 | A | 7/1991 | Miller et al. | |
| 5,039,848 | A | 8/1991 | Stoken | |
| 5,055,086 | A | 10/1991 | Raterman et al. | 453/10 |
| 5,055,657 | A | 10/1991 | Miller et al. | |
| 5,064,999 | A | 11/1991 | Okamoto et al. | |
| 5,080,633 | A | 1/1992 | Ristvedt et al. | 435/6 |
| 5,091,713 | A | 2/1992 | Horne et al. | |
| 5,104,353 | A | 4/1992 | Ristvedt et al. | 453/6 |
| 5,105,601 | A | 4/1992 | Horiguchi et al. | |
| 5,106,338 | A | 4/1992 | Rasmussen et al. | 453/10 |
| 5,111,927 | A | 5/1992 | Schulze | |
| 5,114,381 | A | 5/1992 | Ueda et al. | |
| 5,120,945 | A | 6/1992 | Nishibe et al. | |
| 5,123,873 | A | 6/1992 | Rasmussen | 453/10 |
| 5,129,205 | A | 7/1992 | Rasmussen | 53/52 |
| 5,135,435 | A | 8/1992 | Rasmussen | 453/56 |
| 5,140,517 | A | 8/1992 | Nagata et al. | |
| 5,141,443 | A | 8/1992 | Rasmussen et al. | 453/10 |
| 5,141,472 | A | 8/1992 | Todd et al. | 453/10 |
| 5,145,455 | A | 9/1992 | Todd | 453/6 |
| 5,146,067 | A | 9/1992 | Sloan et al. | |
| 5,154,272 | A | 10/1992 | Nishiumi et al. | |
| 5,163,866 | A | 11/1992 | Rasmussen | 453/10 |
| 5,163,867 | A | 11/1992 | Rasmussen | 453/10 |
| 5,163,868 | A | 11/1992 | Adams et al. | |
| 5,167,313 | A | 12/1992 | Dobbins et al. | |
| 5,175,416 | A | 12/1992 | Mansvelt et al. | |
| 5,176,565 | A | 1/1993 | Ristvedt et al. | 453/6 |
| 5,179,517 | A | 1/1993 | Sarbin et al. | |
| 5,183,142 | A | 2/1993 | Latchinian et al. | |
| 5,184,709 | A | 2/1993 | Nishiumi et al. | |
| 5,194,037 | A | 3/1993 | Jones et al. | 453/10 |
| 5,197,919 | A | 3/1993 | Geib et al. | 453/10 |
| 5,205,780 | A | 4/1993 | Rasmussen | 453/10 |
| 5,207,784 | A | 5/1993 | Schwartzendruber | |
| 5,209,696 | A | 5/1993 | Rasmussen et al. | 453/10 |
| 5,243,174 | A | 9/1993 | Veeneman et al. | |
| 5,251,738 | A | 10/1993 | Dabrowski | |
| 5,252,811 | A | 10/1993 | Henochowicz et al. | |
| 5,253,167 | A | 10/1993 | Yoshida et al. | |
| 5,265,874 | A | 11/1993 | Dickinson et al. | |
| 5,268,561 | A | 12/1993 | Kimura et al. | |
| 5,277,651 | A | 1/1994 | Rasmussen et al. | 453/10 |
| 5,282,127 | A | 1/1994 | Mii | |
| 5,286,226 | A | 2/1994 | Rasmussen | 453/10 |
| 5,286,954 | A | 2/1994 | Sato et al. | |
| 5,291,003 | A | 3/1994 | Avnet et al. | |
| 5,293,981 | A | 3/1994 | Abe et al. | |
| 5,297,030 | A | 3/1994 | Vassigh et al. | |
| 5,297,598 | A | 3/1994 | Rasmussen | 141/314 |
| 5,297,986 | A | 3/1994 | Ristvedt et al. | 453/6 |
| 5,299,977 | A | 4/1994 | Mazur et al. | 453/10 |
| 5,326,104 | A | 7/1994 | Pease et al. | |
| 5,370,575 | A | 12/1994 | Geib et al. | 453/3 |
| 5,372,542 | A | 12/1994 | Geib et al. | 453/10 |
| 5,374,814 | A | 12/1994 | Kako et al. | |
| 5,379,344 | A | 1/1995 | Larsson et al. | |
| 5,382,191 | A | 1/1995 | Rasmussen | 453/11 |
| 5,390,776 | A | 2/1995 | Thompson | |
| 5,401,211 | A | 3/1995 | Geib et al. | 453/10 |
| 5,410,590 | A | 4/1995 | Blood et al. | |
| RE34,934 | E | 5/1995 | Raterman et al. | 453/10 |
| 5,425,669 | A | 6/1995 | Geib et al. | 453/10 |
| 5,429,550 | A | 7/1995 | Mazur et al. | 453/10 |
| 5,450,938 | A | 9/1995 | Rademacher | |
| 5,453,047 | A | 9/1995 | Mazur et al. | 453/10 |
| 5,468,182 | A | 11/1995 | Geib | 453/10 |
| 5,470,079 | A | 11/1995 | LeStrange et al. | |
| 5,474,495 | A | 12/1995 | Geib et al. | 453/3 |
| 5,474,497 | A | 12/1995 | Jones et al. | 453/17 |
| 5,480,348 | A | 1/1996 | Mazur et al. | 453/10 |
| 5,489,237 | A | 2/1996 | Geib et al. | 453/12 |
| 5,500,514 | A | 3/1996 | Veeneman et al. | |
| 5,501,631 | A | 3/1996 | Mennie et al. | 453/3 |
| 5,507,379 | A | 4/1996 | Mazur et al. | 194/318 |
| 5,514,034 | A | 5/1996 | Jones et al. | 453/10 |
| 5,520,577 | A | 5/1996 | Rasmussen | 453/56 |
| 5,538,468 | A | 7/1996 | Ristvedt et al. | 453/3 |
| 5,542,880 | A | 8/1996 | Geib et al. | 453/10 |
| 5,542,881 | A | 8/1996 | Geib | 453/10 |
| 5,553,320 | A | 9/1996 | Matsuura et al. | |

| | | | | |
|---|---|---|---|---|
| 5,559,887 | A | 9/1996 | Davis et al. | |
| 5,564,546 | A | 10/1996 | Molbak et al. | |
| 5,564,974 | A | 10/1996 | Mazur et al. | 453/10 |
| 5,564,978 | A | 10/1996 | Jones et al. | 453/17 |
| 5,570,465 | A | 10/1996 | Tsakanikas | |
| 5,573,457 | A | 11/1996 | Watts et al. | 453/31 |
| 5,584,758 | A | 12/1996 | Geib | 453/10 |
| 5,592,377 | A | 1/1997 | Lipkin | |
| 5,602,933 | A | 2/1997 | Blackwell et al. | |
| 5,620,079 | A | 4/1997 | Molbak | |
| 5,625,562 | A | 4/1997 | Veeneman et al. | |
| 5,630,494 | A | 5/1997 | Strauts | 194/317 |
| 5,641,050 | A | 6/1997 | Smith et al. | |
| 5,650,605 | A | 7/1997 | Morioka et al. | |
| 5,652,421 | A | 7/1997 | Veeneman et al. | |
| 5,743,373 | A | 4/1998 | Strauts | 194/318 |
| 5,746,299 | A | 5/1998 | Molbak et al. | |
| 5,774,874 | A | 6/1998 | Veeneman et al. | |
| 5,782,686 | A | 7/1998 | Geib et al. | 453/10 |
| 5,799,767 | A | 9/1998 | Molbak | |
| 5,813,510 | A | 9/1998 | Rademacher | |
| 5,830,054 | A | 11/1998 | Petri | |
| 5,842,188 | A | 11/1998 | Ramsey et al. | |
| 5,842,916 | A | 12/1998 | Gerrity et al. | |
| 5,850,076 | A | 12/1998 | Morioka et al. | |
| 5,854,581 | A | 12/1998 | Mori et al. | |
| 5,865,673 | A | 2/1999 | Geib et al. | 453/10 |
| 5,868,236 | A * | 2/1999 | Rademacher | 194/217 |
| 5,880,444 | A | 3/1999 | Shibata et al. | |
| 5,892,211 | A | 4/1999 | Davis et al. | |
| 5,892,827 | A | 4/1999 | Beach et al. | |
| 5,909,793 | A | 6/1999 | Beach et al. | |
| 5,909,794 | A | 6/1999 | Molbak et al. | |
| 5,918,748 | A | 7/1999 | Clark et al. | |
| 5,940,623 | A | 8/1999 | Watts et al. | 395/712 |
| 5,944,600 | A | 8/1999 | Zimmermann | |
| 5,951,476 | A | 9/1999 | Beach et al. | |
| 5,957,262 | A | 9/1999 | Molbak et al. | |
| 5,988,348 | A | 11/1999 | Martin et al. | |
| 5,995,949 | A | 11/1999 | Morioka et al. | |
| 5,997,395 | A | 12/1999 | Geib et al. | 453/10 |
| 6,017,270 | A | 1/2000 | Ristvedt et al. | |
| 6,021,883 | A | 2/2000 | Casanova et al. | 194/217 |
| 6,032,859 | A | 3/2000 | Muehlberger et al. | |
| 6,039,644 | A | 3/2000 | Geib et al. | 453/10 |
| 6,039,645 | A | 3/2000 | Mazur | 453/10 |
| 6,042,470 | A | 3/2000 | Geib et al. | 453/10 |
| 6,047,807 | A | 4/2000 | Molbak | |
| 6,047,808 | A | 4/2000 | Neubarth et al. | |
| 6,056,104 | A | 5/2000 | Neubarth et al. | |
| 6,080,056 | A | 6/2000 | Karlsson | |
| 6,082,519 | A | 7/2000 | Martin et al. | |
| 6,086,471 | A | 7/2000 | Zimmermann | |
| 6,095,313 | A | 8/2000 | Molbak et al. | |
| 6,116,402 | A | 9/2000 | Beach et al. | |
| 6,131,625 | A | 10/2000 | Casanova et al. | 141/314 |
| 6,139,418 | A | 10/2000 | Geib et al. | 453/10 |
| 6,145,738 | A | 11/2000 | Stinson et al. | |
| 6,168,001 | B1 | 1/2001 | Davis | |
| 6,171,182 | B1 | 1/2001 | Geib et al. | 453/10 |
| 6,174,230 | B1 | 1/2001 | Gerrity et al. | |
| 6,196,371 | B1 | 3/2001 | Martin et al. | |
| 6,196,913 | B1 | 3/2001 | Geib et al. | 453/10 |
| 6,230,928 | B1 | 5/2001 | Hanna et al. | |
| 6,308,887 | B1 | 10/2001 | Korman et al. | |
| 6,318,536 | B1 | 11/2001 | Korman et al. | |
| 6,318,537 | B1 | 11/2001 | Jones et al. | 194/346 |
| 6,438,230 | B1 | 8/2002 | Moore | |
| 6,471,030 | B1 | 10/2002 | Neubarth et al. | |
| 6,474,548 | B1 | 11/2002 | Montross et al. | |
| 6,484,863 | B1 | 11/2002 | Molbak | |
| 6,484,884 | B1 | 11/2002 | Gerrity et al. | |
| 6,494,776 | B1 | 12/2002 | Molbak | |
| 6,499,277 | B1 | 12/2002 | Warner et al. | 53/447 |
| 6,520,308 | B1 | 2/2003 | Martin et al. | |
| 6,547,131 | B1 | 4/2003 | Foodman et al. | |
| 6,552,781 | B1 | 4/2003 | Rompel et al. | |
| 6,554,185 | B1 | 4/2003 | Montross et al. | |
| 6,579,165 | B2 | 6/2003 | Kuhlin et al. | 453/3 |

| | | | | |
|---|---|---|---|---|
| 6,602,125 | B2 | 8/2003 | Martin | |
| 6,609,604 | B1 | 8/2003 | Jones et al. | 194/302 |
| 6,612,921 | B2 | 9/2003 | Geib et al. | 453/13 |
| 6,637,576 | B1 | 10/2003 | Jones et al. | 194/216 |
| 6,663,675 | B2 | 12/2003 | Blake et al. | 753/63 |
| 6,666,318 | B2 | 12/2003 | Gerrity et al. | |
| 6,755,730 | B2 | 6/2004 | Blake et al. | 453/3 |
| 6,758,316 | B2 | 7/2004 | Molbak | |
| 6,766,892 | B2 | 7/2004 | Martin et al. | |
| 6,783,452 | B2 | 8/2004 | Hino et al. | |
| 6,783,785 | B1 | 8/2004 | Hino et al. | |
| 6,786,398 | B1 | 9/2004 | Stinson et al. | |
| 6,854,581 | B2 | 2/2005 | Molbak | |
| 6,854,640 | B2 | 2/2005 | Peklo | 235/100 |
| 6,863,168 | B1 | 3/2005 | Gerrity et al. | |
| 6,892,871 | B2 | 5/2005 | Strauts et al. | 194/302 |
| 6,896,118 | B2 | 5/2005 | Jones et al. | 194/217 |
| 6,966,417 | B2 | 11/2005 | Peklo et al. | 194/344 |
| 6,976,570 | B2 | 12/2005 | Molbak | |
| 6,988,606 | B2 | 1/2006 | Geib et al. | 194/334 |
| 6,991,530 | B2 | 1/2006 | Hino et al. | |
| 7,004,831 | B2 | 2/2006 | Hino et al. | |
| 7,014,029 | B2 | 3/2006 | Winters | |
| 7,017,729 | B2 | 3/2006 | Gerrity et al. | |
| 7,018,286 | B2 | 3/2006 | Blake et al. | 453/61 |
| 7,028,827 | B1 | 4/2006 | Molbak et al. | |
| 7,036,651 | B2 | 5/2006 | Tam et al. | 194/217 |
| 7,038,398 | B1 * | 5/2006 | Lys et al. | 315/291 |
| 7,083,036 | B2 | 8/2006 | Adams | |
| 7,113,929 | B1 | 9/2006 | Beach et al. | |
| 7,131,580 | B2 | 11/2006 | Molbak | |
| 7,149,336 | B2 | 12/2006 | Jones et al. | 382/135 |
| 7,158,662 | B2 | 1/2007 | Chiles | 382/135 |
| 7,188,720 | B2 | 3/2007 | Geib et al. | 194/302 |
| 7,213,697 | B2 | 5/2007 | Martin et al. | |
| 7,243,773 | B2 | 7/2007 | Bochonok et al. | 194/350 |
| 7,269,279 | B2 | 9/2007 | Chiles | 382/135 |
| 7,290,705 | B1 * | 11/2007 | Shin | 235/381 |
| 7,303,119 | B2 | 12/2007 | Molbak | |
| 7,331,521 | B2 | 2/2008 | Sorenson et al. | |
| 7,337,890 | B2 | 3/2008 | Bochonok et al. | 194/353 |
| 7,427,230 | B2 | 9/2008 | Blake et al. | 453/63 |
| 7,438,172 | B2 | 10/2008 | Long et al. | 194/347 |
| 7,464,802 | B2 | 12/2008 | Gerrity et al. | |
| 7,520,374 | B2 | 4/2009 | Martin et al. | |
| 7,551,764 | B2 | 6/2009 | Chiles et al. | 382/135 |
| 7,552,810 | B2 | 6/2009 | Mecklenburg | 194/317 |
| 7,580,859 | B2 | 8/2009 | Economy | |
| 7,654,450 | B2 | 2/2010 | Mateen et al. | |
| 7,658,270 | B2 | 2/2010 | Bochonok et al. | 194/350 |
| 7,743,902 | B2 | 6/2010 | Wendell et al. | 194/302 |
| 7,778,456 | B2 | 8/2010 | Jones et al. | 382/135 |
| 7,874,478 | B2 | 1/2011 | Molbak | |
| 7,886,980 | B2 | 2/2011 | Nishimura et al. | 194/347 |
| 7,931,304 | B2 | 4/2011 | Brown et al. | |
| 2001/0034203 | A1 | 10/2001 | Geib et al. | 453/3 |
| 2002/0065033 | A1 | 5/2002 | Geib et al. | 453/3 |
| 2002/0069104 | A1 | 6/2002 | Beach et al. | |
| 2002/0107738 | A1 | 8/2002 | Beach et al. | |
| 2002/0117510 | A1 * | 8/2002 | Simson et al. | 221/68 |
| 2002/0126885 | A1 | 9/2002 | Mennie et al. | 382/135 |
| 2002/0130011 | A1 | 9/2002 | Casanova et al. | 194/344 |
| 2002/0151267 | A1 | 10/2002 | Kuhlin et al. | 453/3 |
| 2002/0179401 | A1 | 12/2002 | Knox et al. | |
| 2003/0013403 | A1 | 1/2003 | Blake et al. | 453/60 |
| 2003/0081824 | A1 | 5/2003 | Mennie et al. | 382/135 |
| 2003/0127299 | A1 | 7/2003 | Jones et al. | 194/217 |
| 2003/0168309 | A1 | 9/2003 | Geib et al. | 194/302 |
| 2003/0168310 | A1 | 9/2003 | Strauts et al. | 194/302 |
| 2003/0182217 | A1 | 9/2003 | Chiles | 705/35 |
| 2003/0190882 | A1 | 10/2003 | Blake et al. | 453/63 |
| 2003/0200180 | A1 | 10/2003 | Phelan, III et al. | |
| 2003/0234153 | A1 | 12/2003 | Blake et al. | 194/347 |
| 2004/0055902 | A1 | 3/2004 | Peklo | 206/815 |
| 2004/0092222 | A1 | 5/2004 | Kowalczyk et al. | 453/12 |
| 2004/0099730 | A1 * | 5/2004 | Tuchler et al. | 235/380 |
| 2004/0153406 | A1 | 8/2004 | Luther et al. | |
| 2004/0154899 | A1 | 8/2004 | Peklo et al. | 193/33 |
| 2004/0173432 | A1 | 9/2004 | Jones | 194/216 |

2004/0188221 A1 9/2004 Carter
2004/0200691 A1 10/2004 Geib et al. .................... 194/302
2004/0256197 A1 12/2004 Blake et al. ................... 194/350
2005/0006197 A1 1/2005 Wendell et al. ............... 194/302
2005/0040007 A1 2/2005 Geib et al. .................... 194/302
2005/0045450 A1 3/2005 Geib et al. .................... 194/318
2005/0067305 A1 3/2005 Bochonok et al. ................ 206/8
2005/0077142 A1 4/2005 Tam et al. ..................... 194/217
2005/0087425 A1 4/2005 Peklo ............................ 194/350
2005/0108165 A1 5/2005 Jones et al. ..................... 705/43
2005/0228717 A1 10/2005 Gusler et al.
2005/0256792 A1 11/2005 Shimizu et al.
2006/0054455 A1 3/2006 Kuykendall et al. .......... 194/217
2006/0054457 A1 3/2006 Long et al. .................... 194/347
2006/0064379 A1 3/2006 Doran et al.
2006/0069654 A1 3/2006 Beach et al.
2006/0148394 A1 7/2006 Blake et al. ..................... 453/12
2006/0149415 A1 7/2006 Richards
2006/0151285 A1 7/2006 String
2006/0154589 A1 7/2006 String
2006/0175176 A1 8/2006 Blake ............................ 194/216
2006/0182330 A1 8/2006 Chiles ........................... 382/135
2006/0196754 A1 9/2006 Bochonok et al. ............ 194/347
2006/0205481 A1 9/2006 Dominelli
2006/0207856 A1 9/2006 Dean et al.
2006/0218038 A1 9/2006 Grider
2006/0219519 A1 10/2006 Molbak
2006/0283685 A1 12/2006 Cousin
2007/0051582 A1 3/2007 Bochonok et al. ............ 194/202
2007/0071302 A1 3/2007 Jones et al. ................... 382/135
2007/0108015 A1 5/2007 Bochonok et al. ............ 194/350
2007/0119681 A1 5/2007 Blake et al. ................... 194/215
2007/0187494 A1 8/2007 Hanna
2007/0221470 A1 9/2007 Mennie et al. ................ 194/216
2007/0269097 A1 11/2007 Chiles et al. .................. 382/135
2008/0033829 A1 2/2008 Mennie et al. .................. 705/16
2008/0044077 A1 2/2008 Mennie et al. ................ 382/135
2008/0220707 A1 9/2008 Jones et al. ....................... 453/2
2009/0018959 A1 1/2009 Doran
2009/0057394 A1* 3/2009 DeGironemo ................ 235/379
2009/0236200 A1 9/2009 Hallowell et al. ............. 194/215
2009/0236201 A1 9/2009 Blake et al. ................... 194/215
2009/0239459 A1 9/2009 Watts et al. ...................... 453/18
2009/0242626 A1 10/2009 Jones et al. ................... 235/379
2009/0320106 A1 12/2009 Jones et al. ....................... 726/5
2010/0038419 A1 2/2010 Blake et al. ................... 235/379
2010/0198726 A1 8/2010 Doran et al.
2010/0261421 A1 10/2010 Wendell et al. ................... 453/4
2010/0276485 A1 11/2010 Jones et al. ................... 235/379
2010/0327005 A1 12/2010 Martin et al.
2011/0098845 A1 4/2011 Mennie et al. ................ 700/223
2011/0099105 A1 4/2011 Mennie et al. .................. 705/41

FOREIGN PATENT DOCUMENTS

CA 2 189330 12/2000
CA 2 143 943 3/2003
DE 06 60 354 5/1938
DE 30 21 327 12/1981
EP 0 351 217 1/1990
EP 0 667 973 1/1997
EP 0 926 634 6/1999
EP 1 209 639 5/2002
FR 2042254 2/1971
GB 2 035 642 6/1980
GB 2 175 427 11/1986
GB 2 198 274 6/1988
GB 2 458 387 9/2009
GB 2468783 A 9/2010
JP 49/58899 6/1974
JP 50/158343 12/1975
JP 52/014495 2/1977
JP 52/71300 6/1977
JP 56/40992 4/1981
JP 57/117080 7/1982
JP 59/79392 8/1984
JP 06/016271 2/1985
JP 62/134168 8/1987
JP 62/182995 8/1987
JP 62/221773 9/1987
JP 62/166562 10/1987
JP 64/042789 2/1989
JP 64/067698 3/1989
JP 01/118995 5/1989
JP 64/035683 6/1989
JP 01/307891 12/1989
JP 02/050793 2/1990
JP 02/252096 10/1990
JP 03/012776 1/1991
JP 03/063795 3/1991
JP 03/092994 4/1991
JP 03/156673 7/1991
JP 04/085695 3/1992
JP 04/175993 6/1992
JP 05/274527 10/1993
JP 06/035946 2/1994
JP 06/103285 4/1994
JP 09/251566 9/1997
JP 2002/117439 4/2002
JP 2003/242287 8/2003
JP 2004/213188 7/2004
WO WO 85/00909 2/1985
WO WO 91/06927 A1 5/1991
WO WO 91/08952 A1 6/1991
WO WO 91/12594 A1 8/1991
WO WO 91/18371 A1 11/1991
WO WO 92/08212 A1 5/1992
WO WO 92/20043 A1 11/1992
WO WO 92/20044 A1 11/1992
WO WO 92/22044 A1 12/1992
WO WO 93/00660 A1 1/1993
WO WO 93/09621 5/1993
WO WO 94/06101 3/1994
WO WO 94/08319 A1 4/1994
WO WO 94/23397 A1 10/1994
WO WO 95/02226 A1 1/1995
WO WO 95/04978 A1 2/1995
WO WO 95/06920 A1 3/1995
WO WO 95/09406 A1 4/1995
WO WO 95/13596 A1 5/1995
WO WO 95/19017 A1 7/1995
WO WO 95/23387 A1 8/1995
WO WO 96/07163 A1 3/1996
WO WO 96/07990 A1 3/1996
WO WO 96/12253 A1 4/1996
WO WO 96/27525 A1 9/1996
WO WO 96/27859 A1 9/1996
WO WO 98/24041 6/1998
WO WO 98/24067 A1 6/1998
WO WO 98/48383 10/1998
WO WO 98/48384 10/1998
WO WO 98/48385 10/1998
WO WO 98/51082 11/1998
WO WO 98/59323 A1 12/1998
WO WO 99/00776 1/1999
WO WO 99/06937 A1 2/1999
WO WO 99/33030 7/1999
WO WO 99/41695 8/1999
WO WO 99/48057 A1 9/1999
WO WO 99/48058 A1 9/1999
WO WO 00/48911 A1 8/2000
WO WO 00/65546 A1 11/2000
WO WO 01/63565 A2 8/2001
WO WO 02/071343 A1 9/2002
WO WO 03/052700 6/2003
WO WO 03/079300 A1 9/2003
WO WO 03/085610 A1 10/2003
WO WO 03/107280 A2 12/2003
WO WO 2004/044853 A1 5/2004
WO WO 04/109464 A2 12/2004
WO WO 2005/041134 A2 5/2005
WO WO 2005/088563 A1 9/2005
WO WO 2006/086531 A1 8/2006
WO WO 2007/035420 3/2007
WO WO 2007/120825 A2 10/2007

OTHER PUBLICATIONS

Amiel Industries: AI-1500 ‘Pulsar’ High Performance Sorting and Bagging Machine, 13 pages (date prior to Mar. 2, 2011).

AUI: Coinverter—"No More Lines . . . Self-Serve Cash-Out," by Cassius Elston, 1995 World Games Congress/Exposition Converter, 1 page (dated prior to 1995).
Brandt: System 930 Electric Counter/Sorter, 1 page (date prior to Mar. 2, 2011).
Brandt: 95 Series Coin Sorter Counter, 2 pages (1982).
Brandt: Mach 7 High-Speed Coin Sorter/Counter, 2 pages (1992).
Brandt: Model 1205 Coin Sorter Counter, 2 pages (1986).
Brandt: Model 1400 Coin Sorter/Counter, 2 pages (date prior to Mar. 2, 2011).
Brandt: Model 817 Automated Coin and Currency Ordering System, 2 pages (1983).
Brandt: Model 8904 Upfeed,—High Speed 4-Denomination Currency Dispenser, 2 pages (1989).
Brandt: Model 920/925 Counter, 2 pages (1982).
Brandt: Model 940-6 High Speed Sorter/Counter, 2 pages (date prior to Mar. 2, 2011).
Brandt: Model 952 Coin Sorter/Counter, 2 pages (date prior to Mar. 2, 2011).
Brandt: Model 954 Coin Sorter/Counter, 2 pages (date prior to Mar. 2, 2011).
Brandt: Model 957 Coin Sorter/Counter, 2 pages (date prior to Mar. 2, 2011).
Brandt: Model 958 Coin Sorter/Counter, 5 pages (©1982).
Brandt: Model 960 High-Speed Coin Sorter & Counter, 2 pages (1984).
Brandt: Model 970 Coin Sorter and Counter, 2 pages (1983).
Brandt: System 945 High Speed Sorter, 2 pages (date prior to Mar. 2, 2011).
Brandt; Model 966 Microsort™ Coin Sorter and Counter, 4 pages, (1979).
Case ICC Limited: CDS Automated Receipt Giving Cash Deposit System, 3 pages (date prior to Mar. 2, 2011).
Cash, Martin: Newspaper Article "Bank Blends New Technology With Service," Winnipeg Free Press, 1 page (Sep. 4, 1992).
Childers Corporation: Computerized Sorter/Counter, "To coin an old adage, time is money . . . ,"3 pages (1981).
CTCoin: CDS602 Cash Deposit System, 1 page (date prior to Mar. 2, 2011).
Cummins: Jetsort® Automated Money Processing System Vendors Love Jetsort® 1page (date prior to Mar. 2, 2011).
Cummins: JetSort® Model 1760 Coin Sorter Counter 1page (date prior to Mar. 2, 2011).
Cummins: JetSort® Models 1770 and 3000, Communication Package specification and operating instructions, 10 pages (date prior to Mar. 2, 2011).
Cummins: JetSort® Model 1701 With Jetstops Coinsorter Operating Instructions Manual (©1984), 16 pages.
Cummins: Jetsort® Model CA700-01 Coin Sorter Counter Operating Instructions (©1982), 14 pages.
Cummins: Jetsort® Model 3000 Series Options Talking Jetsort® 3000 1page (date prior to Mar. 2, 2011).
Cummins: JetSort® Model CA-750 Coin Sorter/Counter and CA-4050 JetCount currency counter, "Money Processing Made Easy," 2 pages (date prior to Mar. 2, 2011).
Cummins: The Universal Solution to All Coin and Currency Processing Needs (Form 13C1218 3-83), 1 page (date prior to Mar. 2, 2011).
Cummins: Jetsort® Time for A Change—Be A Smashing Success 1 page, (date prior to Mar. 2, 2011).
Cummins: Jetsort® Time for A Change—*JetSort®* vs *Brandt X*, 1 page, (date prior to Mar. 2, 2011).
Cummins: Jetsort®, Time for A Change—No Coins Sorted After 3:00 or on Saturday, 1 page (date prior to Mar. 2, 2011).
Cummins: Jetsort®, What do all these Banks have in Common, 3 pages (date prior to Mar. 2, 2011).
Cummins: Jetsort® 700-01, Cummins Automated Money Systems (AMS) Case Study—First State Bank of Oregon, "JetSort® Gives Bank Coin Service Edge," 2 pages (date prior to Mar. 2, 2011).
Cummins: JetSort® 701, Cummins Automated Money Systems (AMS) Case Study—Convenco Vending, "High Speed Coin Sorter increases [] processing power at Convenco Vending," 1 page (date prior to Mar. 2, 2011).
Cummins: Jetsort® Model 3200, Enhanced Elecrtronics for Jetsort® 3200, 1page, (date prior to Mar. 2, 2011).
Cummins: JetSort® High Speed Coin Sorter &Counter, "Ctocs Ready" (Form 023-1365), 2 pages (date prior to Mar. 2, 2011).
Cummins: Jetsort® Model 3000, Sorts Counts 3000 Mixed Coins Per Min, 1page, (date prior to Mar. 2, 2011).
Cummins: JetSort® Model 1770, "JetSort® Speed and Accuracy, Now with Communications!", (Form 023-1272) 1 page (date prior to Mar. 2, 2011).
Cummins: JetSort® 700-01/CA-118 Coin Wrapper, Cummins Automated Money Systems (AMS) Case Study—University State Bank, "Cummins Money Processing System Boosts Teller Service at University State Bank," 2 pages (date prior to Mar. 2, 2011).
Cummins: Jetsort® Model CA130XL Case Study Coin Sorter Counter Keeps Pace With Fith Third Bank, 2pages (date prior to Mar. 2, 2011).
Cummins: Jetsort® One Moving Part Simplicity Vendors Are Validators Changing Your Coin/Currency 3pages (date prior to Mar. 2, 2011).
Cummins: Jetsort® Model Series V, High Speed Coin Sorter Counter, 2pages (date prior to Mar. 2, 2011).
Cummins: Jetsort® Models 701 and 750 , "State-of-the-art coin processing comes of age," 2 pages (Feb. 1984).
Cummins: Jetsort® Cash Information and Settlement Systems 4pages, (date prior to Mar. 2, 2011).
Cummins: Jetsort® Model CA 750 Jetsort® Coin Processor, 1page (date prior to Mar. 2, 2011).
Cummins: Jetsort® Model 2000 Series Jetsort® High speed Coin Sorters, 2pages (date prior to Mar. 2, 2011).
Cummins: Jetsort® Model 3000 Series High Speed Coin Counter 2 pages, (date prior to Mar. 2, 2011).
De La Rue: CDS 500 Cash Deponier System, 6 pages (date prior to Mar. 2, 2011) (German).
De La Rue: CDS 5700 and CDS 5800 Cash Deponier System, 7 pages (date prior to Mar. 2, 2011) (German) and translation.
Diebold: Merchant MicroBranch, "Merchant MicroBranch Combines ATM After-Hour Depository Rolled-Coin Dispenser," Bank Technology News, 1 page (11/97).
Fa. GBS-Geldbearbeitungssyseme: GBS9401SB Technical Specification, 24 pages (date prior to Mar. 2, 2011).
Frisco Bay: Commercial Kiosk, 4 pages (date prior to Mar. 2, 2011).
Glory: AMT Automated Merchant Teller, 4 pages (date prior to Mar. 2, 2011).
Glory: CRS-8000 Cash Redemption System, 2 pages (1996).
Hamilton: Hamilton's Express Banking Center, In Less Space Than A Branch Manager's Desk, 4 pages (date prior to Mar. 2, 2011).
ISH Electronic: ISH 12005/500 Coin Counter (with translation), 4 pages (date prior to Mar. 2, 2011).
ISH Electronic: ISH 12005/501 Self-Service Unit (with translation), 4 pages (date prior to Mar. 2, 2011).
Namsys, Inc.: Namsys Express, Making currency management . . . more profitable, 2 pages (date prior to Mar. 2, 2011).
Perconta: Contomat Coin Settlement Machine for Customer Self Service, 2 pages (date prior to Mar. 2, 2011).
Prema GmbH: Prema 405 (RE) Self Service Coin Deposit Facility, 2 pages (date prior to Mar. 2, 2011).
Reis Eurosystems: CRS 6501/Crs 6510 Cash Receipt Systems, 4 pages (date prior to Mar. 2, 2011).
Reis Eurosystems: CRS 6520/ CRS 6525 Standard-Class Coin Deposit Systems, 1 page (date prior to Mar. 2, 2011).
Reis Eurosystems: CS 3510 Disc-Sorter, 1 page (date prior to Mar. 2, 2011).
Royal Bank: Hemeon, Jade, "Royal's Burlington drive-in bank provides customers 24-hour tellers," The Toronto Star, 1 page (Aug. 21, 1991).
Royal Bank: Leitch, Carolyn, "High-Tech Bank Counts Coins," The Globe and Mail, 2 pages (Sep. 19, 1991).
Royal Bank: Oxby, Murray, "Royal Bank Opens 'Super Branch,'" The Gazette Montreal, 2 pages (Sep. 14, 1991).
Royal Bank: SuperBranch, 2 pages (Feb. 1992).
Scan Coin: CDS 600 & CDS 640 Cash Deposit System—Technical Manual, 45 pages (date prior to Mar. 2, 2011).

Scan Coin: CDS 600 User's Manual, 14 pages (date prior to Mar. 2, 2011).
Scan Coin: CDS Cash Deposit System, 6 pages (date prior to Mar. 2, 2011).
Scan Coin: CDS Coin Deposit System—Technical Referens Manual, 47 pages (1989).
Scan Coin: CDS MK 1 Coin Deposit System—Technical Manual, 32 pages (1991).
Scan Coin: International Report, 49 pages (Apr. 1987).
Scan Coin: Money Processing Systems, 8 pages (date prior to Mar. 2, 2011).
Scan Coin: SC 102 Value Counter Technical Manual, 28 pages (date prior to Mar. 2, 2011).
Scan Coin: World, 2 pages (Feb. 1988).
Cummins: JetSort® High Speed Sorter/Counter Kits I & J—Operating Instructions (Form 022-7123-00) 12 pages (1994).
NGZ Geldzahlmaschinengesellschaft: NGZ 2100 Automated Coin Depository, 4 pages (date unknown, prior to Sep. 1996).

* cited by examiner

SELF SERVICE COIN REDEMPTION CARD PRINTER-DISPENSER

RELATED APPLICATION

This application is related to and claims priority to U.S. Provisional Patent Application Ser. No. 61/039,264 filed Mar. 25, 2008, titled "Self Service Coin Redemption Card Printer-Dispenser," which is incorporated herein by reference in its entirety.

TECHNICAL FIELD

The following disclosure relates generally to kiosks and coin redemption machines. More specifically, the following disclosure relates to kiosks and coin redemption machines that dispense multiple types of cards from a single card stack.

BACKGROUND

Coin processing machines are used in both the financial industry to sort, count and/or package coins and in the retain sector as a publicly accessible redemption machine to exchange loose change for a ticket or voucher.

In some conventional processing machines, each of a plurality of coin denominations are separated from the remaining denominations and stored in a receptacle specific to that denomination. In other conventional processing applications, the sorted coins are counted and collected into at least one or more coin bins or receptacles of mixed denominations or combination of single and mixed denominations.

In addition to processing of a plurality of coins, these redemption machines have a focus of self-service application, limiting intervention of attendants and service personnel. These approaches provide a service to the consumer that allows the exchange of the coin for a voucher. This voucher is redeemed for the amount of coins deposited in the form of banknotes by an employee such as a cashier. Balancing is required, daily, weekly, or other frequencies between vouchers cashed to the coins processed by the armored carrier. These redemption machines also require service from the tellers, cashiers, or clerks to manage the bags, change and clear receptacles and bags, and call for pick-ups as required. The armored carriers provide a service of picking up the coin receptacles and processing the coins for a fee. The value is provided back to the financial institution or retail store.

Some prior art systems exist for dispensing a value card (e.g., a gift card) for the value of coins deposited in coin redemption machines. However, these prior art systems suffer from several shortcomings. For example, prior art systems are limited in the variety of value card types that may be purchased. Typically, prior art systems require pre-printed value cards of differing predetermined values specific to the type of value card dispensed. To provide several card varieties, some prior art systems require additional dispensers, which unfavorably increase the machine's footprint and cost. Other prior art systems disclose carriage mechanisms that shuttle between stacks of pre-printed value cards to dispense a selected card type. However, these prior art systems also require larger machine footprints and more frequent servicing when one particular card type has run out but other card types have not.

SUMMARY

In another aspect of the present concepts, a method of transferring funds to a personalized portable storage medium using a kiosk is provided and includes the acts of receiving funds comprising a batch of loose mixed coins in a coin receiving area of the kiosk, processing the coins in a coin processing module, determining a total value of the funds using a controller, displaying the total value of the funds to a user of the kiosk, and permitting the user to select a desired graphic from amongst a plurality of available graphic selections using via a user input device. The method also includes the acts of printing, using a printing device, the user-selected graphic on a portable storage medium print area, the portable storage medium comprising a storage medium bearing data to which a value relating to the total value is associated and dispensing the portable storage medium bearing the user-selected graphic to the user, the portable storage medium having a first value relating to the total value.

In another aspect of the present concepts, a method of transferring funds to a personalized portable storage medium or a remote account in association with a portable storage medium in a kiosk includes the acts of receiving in said kiosk funds from a user, determining a total value of the funds, permitting a user to select a desired graphic and/or a gift card provider (e.g., Starbucks, etc.) from amongst a plurality of available graphic selections and/or gift card providers (e.g., Blackhawk, Lettuce Entertain You, etc.) either directly through selectable elements or though an internet interface, printing the user-selected graphic on a portable storage medium print area, the portable storage medium including a storage medium bearing data to which a value relating to the total value is associated, and dispensing the portable storage medium bearing the user-selected graphic to the user.

In yet another aspect of the present concepts, a kiosk for transferring funds to a personalized portable storage medium includes a coin receiving area configured to receive a batch of loose mixed coins, a coin processing module configured, in combination with a controller, sort the loosed mixed coins to determine a total value thereof, a user-input device, a storage device comprising a plurality of articles of a portable storage medium, each portable storage medium comprising a storage medium bearing data to which a value relating to the total value is associated, and a display configured, in combination with the controller and controller-executable instructions, to display to a user a plurality of user-selectable graphic options selectable by the user through the user input device. The kiosk also includes a printing device configured to receive a portable storage medium from the portable storage medium storage device, to print on a print area of the portable storage medium the user-selected graphic, and to dispense the portable storage medium following printing.

In still another aspect of the present concepts, a kiosk for transferring funds to a personalized portable storage medium includes a value input device configured to value only from a portable electronic storage device, a user-input device configured to facilitate a transfer of a first value from the portable electronic storage device to the kiosk, a storage device comprising a plurality of articles of a portable storage medium, each portable storage medium comprising a storage medium bearing data to which a value relating to the first value is associated, a display configured, in combination with the controller and controller-executable instructions, to display to a user a plurality of user-selectable graphic options selectable by the user through the user input device, and a printing device configured to receive a portable storage medium from the portable storage medium storage device, to print on a print area of the portable storage medium the user-selected graphic, and to dispense the portable storage medium following printing.

The above summary of the present invention is not intended to represent each embodiment or every aspect of the present invention. The detailed description and Figures describe various embodiments and aspects of the present invention.

Figure 1:
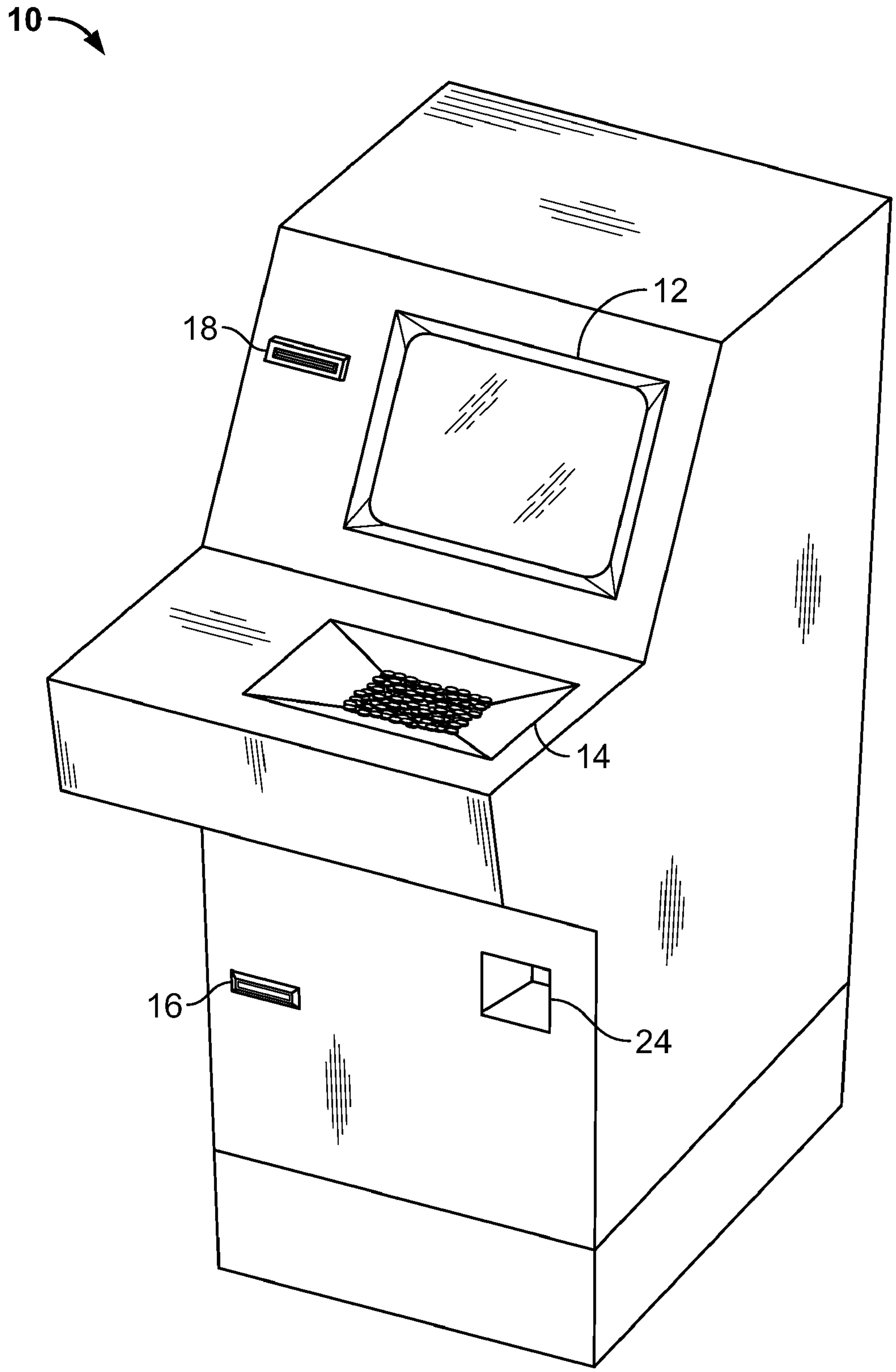
FIG. 1 is a perspective view of a coin redemption machine according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms or physical configurations depicted or disclosed. Rather, the invention is to cover all modifications, equivalents, arrangements and alternatives falling within the spirit and scope of the invention.

DETAILED DESCRIPTION OF ILLUSTRATED EMBODIMENTS

The following disclosure describes apparatuses and methods for dispensing value cards from coin redemption machines. The value cards described herein can be classified generally as closed-loop cards, semi-closed loop cards, open-loop cards, or virtual value cards, and may be either disposable or reloadable.

As used herein, the term "closed-loop cards" refers to cards that have an associated monetary value that is redeemable only at the merchant that issues or is specifically designated on the card. Non-limiting examples of closed loop cards include prepaid phone cards, prepaid gas cards, prepaid grocery cards, prepaid entertainment cards, prepaid movie cards, downloadable ring tone cards, downloadable game cards, downloadable movie cards, downloadable music cards that use MP3, MP4, WMV, WAV, or other music formats, any other downloadable software card, customer rewards cards, and bridge and/or road toll cards. Other examples include prepaid Best Buy gift Cards, Macy's gift cards, and ITunes gift cards. Further, as used herein, the term "semi-closed loop cards" refers to cards that are redeemable at multiple merchants. One non-limiting example of a semi-closed loop card is a mall gift card with an associated monetary value that may be redeemed at any merchant within a designated shopping mall. Additionally, as used herein, the term "open-loop cards" refers to cards that can be used for multiple purposes and at multiple points of sale, such as making purchases at a variety of stores or paying bills. Open-loop cards may be "branded" with an issuer's or provider's logo (e.g., American Express, VISA, etc.) and are generally redeemable at any merchant that accepts the designated providers company's regular credit cards (e.g., any merchant that accepts American Express credit cards will accept a Prepaid American Express Gift Credit Card). However, these "branded" open-loop cards bearing the of are not credit cards and are, at least initially, associated with a specific, pre-paid balance. Other open-loop cards may be "non-branded" value cards that utilize PIN-based technology and enable transactions only through POS or ATM networks in combination with the requisite PIN.

A virtual value card is designed for internet and mobile commerce and is a branded (e.g., VISA, MasterCard, etc.) virtual debit card specifically for online purchases. These virtual value cards are associated with accounts that operate like PayPal (an online closed loop private network) and work under the same rules as value card account. Finally, as used herein, the terms "value card types" or "type of value card" may be used to refer to different card classifications (e.g., closed-lop vs. open loop) and/or different merchant designations (e.g., Best Buy gift cards vs. Macy's gift cards) within card classifications. For example, a closed loop Macy's card is a different type from a Prepaid American Express Gift Credit Card.

The value cards include a data storage media feature for reading information from and/or writing information to the value cards. Such media features may include, for example, memory chips, bar codes, magnetic strips, radio frequency tags, embedded integrated circuits, optical devices, solid state memory devices, combination thereof, or the like. The issuer or provider is the financial institution or entity that issues the value card to the card holder and each issuer or provider is associated with an Issuer Identification Number (IIN) and, in the case of programs using the MasterCard or VISA networks, a bank identification number (BIN). These IIN and/or BIN numbers are encoded into the card media feature to permit the card to be associated with the identified provider for consummation of electronic funds transactions.

Some value cards are linked directly to separate accounts held by the individual card holder, whereas other value cards are not linked to a traditional bank account, but are rather associated with a pooled funds account or concentrator account in which all of the funds associated with the value cards of all participants of the value program are maintained with different subaccounts for each card. Providers of value cards that provide value card networks include, but are not limited to, Blackhawk, Incomm, ValueLink, Stored Value Systems, VendiCard, TSYS, DataWave, Stored Value Solutions, Comdata, and GiftClixx. In these value card networks, the provider manages the value card for a number of participating brands (e.g., Starbucks, Circuit City, Barnes & Noble, Major League Baseball, etc.).

In some embodiments, a monetary value is locally stored on the media feature of the value card. Each time a portion of the monetary value is redeemed, the monetary value stored on the media feature is decremented by the amount of redemption. Likewise, if additional monetary value is added to the value card, the monetary value stored on the media feature is incremented by the amount added. One example of this is a smart card, which contains an embedded integrated circuit (IC) which can process data, as well as a tamper-resistant security system (e.g. secure cryptoprocessor, secure file system, human-readable features, etc.) to preserve confidentiality of information in the memory of the IC. Value or assets on the smart card are managed via a central administration system which interchanges information and configuration settings with the card through the security system. In other embodiments, only a user account number is stored on the media feature of the value card. The monetary value associated with the user account number is maintained in an external database on, for example, a network, server, remote computer, combinations thereof, or the like. Each time a portion of the monetary value is redeemed, the merchant accesses the external database, determines the monetary value associated with the account, decrements the amount of redemption, and applies the amount of redemption towards the purchase.

In some embodiments, the coin redemption machines may dispense the value card only after registering and activating the value card with an issuing entity or approved third party. To facilitate the use of a single, generic "blank" or "partially blank" value card to which may be applied any number of separate associations with one or more stores or accounts, a coin redemption machine may be connected to a provider or issuer network including blocks of account numbers set aside for assignment to value cards. For example, in some aspects, a "blank" value card contains a unique identification number or code and the database tracks the stored value media by such identification number or code. The "blank" or "partially blank" value cards may also comprise some minimal printed information and/or graphics such as a provider or issuer logo (e.g., VISA) and text (e.g., legal printing and provider/issuer contact information on back of card). A customer desiring to associate the stored value media to be dispensed to Store X, or even plural stores (e.g., Store X and Store Y), having made such selections through a coin redemption machine user interface, would be issued a value card having a unique identification number(s) or code(s) associated in the network to the store(s) designated by the customer. Thus, the individual stored value media need not necessarily have pre-stored or pre-formatted thereon specific account information or specific store names and such information may be written to and/or printed on such value card, if at all, upon issuance. Of course, the issued value card may be pre-stored or pre-formatted thereon to concretely associate the stored value media to a specific store or issuing source (e.g., bank) and all account information needed to permit activation of the account by transfer of the account information to the store, issuing authority, or third party managing card issuance for such store or issuing authority.

Referring to the drawings and initially to FIG. 1, a coin redemption machine 10 according to one embodiment of the present invention includes a touch screen 12 to provide inputs from a machine user and also to display outputs to be viewed by the user. While a touch screen 12 is illustrated in FIG. 1 for receiving data entered by a user of the coin redemption machine 10, the coin redemption machine 10 may also include input devices comprising, for example, a mechanical keyboard, a keypad, buttons, and/or touchpad to receive such inputs.

The coin redemption machine 10 includes a coin input area 14 which receives coins of mixed denominations from a user. The coin input area 14 allows the user of the coin processing machine 10 to deposit the user's coins, as a batch, which will ultimately be converted to some other sort of fund source (e.g., value card(s), banknote(s), coins(s), token(s), electronic funds, etc.) that is available to the user.

According to the embodiment of the coin redemption machine 10 illustrated in FIG. 1, the coin input area 14 is generally funnel-shaped to direct coins to a coin processing area within the machine 10. According to another alternative embodiment, the coin input area 14 includes a gravity-feed coin input tray as is discussed in further detail below. According to still another alternative embodiment of the coin redemption machine 10, the coin input area 14 includes a coin tray that is pivotable from a first position, wherein the coin tray is substantially horizontal, to a second position, wherein the coin tray is lifted causing the coins to slide under the force of gravity into the coin redemption machine 10.

In its simplest form, the coin redemption machine 10 receives coins via the coin input receptacle 14 and the coins are authenticated and counted. After the user makes a card type selection and/or other inputs using the touch screen 12, a card printer prints a graphic on a value card, which is redeemable for the total amount of the deposited coins or for an amount related thereto, such as the total amount of the deposited coins less a transaction fee. The transaction fee, in some aspects, is set to a fixed percentage of a processed coin value, such as 9%, 8%, 7%, etc. of the processed coin value. Alternatively, the transaction fee could be a variable percentage for different ranges of values of processed coins (e.g., 9% for a value up to $20, 8% for values between $20.01 and $40.00, 7% for values between $40.01 and $60.00, etcetera). Still further, the transaction fee could be set to a flat fee per transaction. The transaction fees may optionally be set The fees may, in other aspects, comprise a la carte charges that vary depending upon the options selected by the user. By way of example, printing on cards in color is not inexpensive on a per card basis and the customer may be charged a first fee for a monochromatic card, a second fee for a color card with color printing on one side, and a third fee for color printing on both sides, perhaps in addition to any separate transaction fees assessed in correspondence with the total value of the processed coins. Thus, a customer may be charged 6% of the total value of the processed coins and a surcharge of $0.50 to print a color image on both sides. Another customer might choose to print, for a charge of $0.25, a color image of the front side of a value card and a black and white image or no image on the back of the card. Moreover, the printing cost per card could be assessed on a surface area of the image, perhaps assessed by quadrant or square inches/centimeters. Thus, printing of a small image or personalized logo would entail a smaller printing fee than a full card image. In yet another aspect, the fee for printing could be waived.

Advantageously, however, a store can offer a value card, or more particularly a store card, a specific type of value card, without charging any fee for printing and/or issuance. Thus, in such as aspect of the present concepts, a patron can deposit $100 in coin and receive a store card having a value of $100 with a user-selected graphic, whereas were the patron to select another alternative (i.e., other than a store card), the patron would be assessed a fee. Still further, where the self-service coin exchange machine 10 dispenses a plurality of value cards including both a store value card and value cards for other providers or issuers (e.g., Starbucks, McDonalds, Target, etc.), the store card (e.g., Safeway) could be associated with a low fee (e.g., 0%, 1% of total value of processed coins, etc.), whereas the other stored value cards could be associated with a higher fee (e.g., 5%, 6%, 7%, etc.). Still further, the fees for printing on various cards could, of course, vary in accord with contractual arrangements between the store and the third parties. Thus, for example, the fees between one card (e.g., a Starbucks value card) may differ from that of another card (e.g., Target value card). To illustrate, the self-service coin exchange machine 10 could be configured to dispense cards and/or add value to a first stored value card (e.g., a Starbucks card) for a first fee (e.g., 6% of the value of the processed coins) and to a second stored value card (e.g., a McDonalds card) for a second fee (e.g., 7% of the value of the processed coins).

The coin redemption machine 10 outputs the value card to the user via a card slot 16. Document slot 18 is advantageously provided to output a receipt of the transaction. An additional document slot(s) may be provided in combination with a document processing module to permit the receipt of and/or the preparation and/or discharge of documents bearing value, such as a gift certificate, check, cash, or voucher. Thus, additional value can be added into the coin redemption machine 10, further to that of the input coins, and any such excess money received by the machine 10 applied to the value card or applied to another form of value selected by a patron.

Where the coin redemption machine 10 is utilized by a patron to obtain a value card or to add value to a value card, the coin redemption machine is optionally configured to output to the patron a code and contact information for replacing the value card should the patron lose the value card. Such code and contract information may be provided, for example, on a dispensed receipt associated with the patron's transaction. In another aspect, the information is transmitted to a patron's selected personal electronic device. In still another aspect, the patron may elect to have the information emailed to the patron at a designated email address or texting address. Other modes of providing such code and contact information to a patron or providing protection against lost value cards are also considered to fall within these concepts including, but not limited to, requiring a patron to register their value card directly with a third party provider or issuer during the transaction or to register their card locally in the retail store in which the patron's card is obtained. Optionally, a patron may further be permitted to associate a PIN with the value card for enhanced security. Once the patron's card is registered, should the patron's card be lost or stolen, the patron would be permitted to provide the code to the appropriate entity, web-site, telephone call service, employee, or the like, and request a replacement card, upon which request the lost or stolen value card would be cancelled (e.g., voided in the provider's or issuer's system) and a new value card issued.

The document processing module may be configured to scan, sort, count, and/or authenticate documents and may comprise elements of, for example, bank note processing modules described in U.S. Pat. Nos. 5,295,196, 5,870,487, 5,875,259, 6,318,537, 7,187,795, 7,256,874, and 7,391,897, each of which is incorporated by reference herein in its entirety. For example, an image capture unit is configured to scan in input document using an image extraction unit (e.g., the unit can have any number of heads, such as one head to image only one side of the document or two heads to obtain full video images of both sides of the documents). The input document can be scanned in either the wide or the narrow direction and the image extraction unit could extract portions of the image of the document for future processing. For example, in the case of a check, the image extraction unit may extract MICR data, courtesy amount (CAR) data, legal amount field (LAR) data, or other data in the case of currency or other types of documents.

Additionally, the coin redemption machine 10 may comprise a currency dispensing module configured to dispense currency bills via a multi-cassette dispenser or a single-cassette dispenser. A multi-cassette dispenser could thus be configured to dispense denominations including $1 bills, $5 bills, $10 bills, and $20 bills. A currency dispensing module could comprise a single-cassette dispenser configured to dispense only $1 bills or only $5 bills, a multi-cassette dispenser configured to dispense $1 bills, $5 bills, and $10 bills, or any other type of configuration adapted to dispense one or more denominations of bills, in any combination, to a currency dispensing receptacle for retrieval by the patron. The currency dispensing module may comprise any OEM currency dispenser. For example, the currency dispensing module may comprise one or more Fujitsu F53, F56, F400, or F510e multi-cassette media dispensers, or combinations thereof. The Fujitsu F53 and F56, for example, feature six cassettes that can hold up to a total of 3,000 bills (500 bills/cassette) in a compact configuration. For example, in a six cassette 127 currency dispensing module 110, two cassettes could be loaded to dispense $1 bills, two cassettes loaded to dispense $5 bills, one cassette loaded to dispense $10 bills, and one cassette loaded to dispense $20 bills. Further aspects of currency dispensing utilizable in association with the disclosed coin redemption machine 10 are disclosed in co-pending U.S. patent application Ser. No. 11/726,828 filed on Mar. 23, 2007, entitled "Apparatus, System And Method For Coin Exchange," incorporated herein by reference in its entirety.

Still further, other dispensing modules can advantageously be incorporated into the coin redemption machine 10 to dispense other items of value including, but not limited to, merchandise or value cards having a predetermined value. In yet other aspects, the coin redemption machine 10 is configurable to dispense items of value including, but not limited to, loose coin, rolled coin, coupons, tickets, or other value storing mediums. Still further, the coin redemption machine 10 may be configured to permit an electronic transfer of funds to a designated device or account via a hardwired or wireless communication device and associated communication path, such electronic transfer being directed to, for example, a store patron bank account or store account, an electronic transfer to a third party account (e.g., a creditor of the patron), or an electronic transfer to a portable electronic device. For example, in one aspect, the coin redemption machine 10 is configured to transfer of all of or a portion of the total value due a patron (e.g., a remainder following disbursement to the patron of a portion of the total value in currency) via electronic transmission (e.g., near field communication) of such desired amount to a patron's portable electronic storage device (e.g., a cellular phone, electronic purse, electronic wallet, electronic cash, fob, etc). Moreover, in some aspects, a patron is permitted to supplement any desired output of value from the coin redemption machine 10 (e.g., a check, a gift certificate, a value card, etc.) through a transfer of funds from a store patron bank account or store account or from a patron's portable electronic device. Thus, a patron inputting $85.25 in coin into the coin redemption machine 10 may transfer an extra $14.75 from the patron's cellular phone to permit the purchase of concert tickets having a cost of $100.00. In another example, a patron desiring to purchase a $100.00 gift card following an input of $53.84 may select an option to transfer the balance of $46.16, including any optional, denoted transaction fees to be assessed, from the patron's bank account to the coin redemption machine 10 following access to such account (e.g., via input of bank card and PIN).

Figure 2:
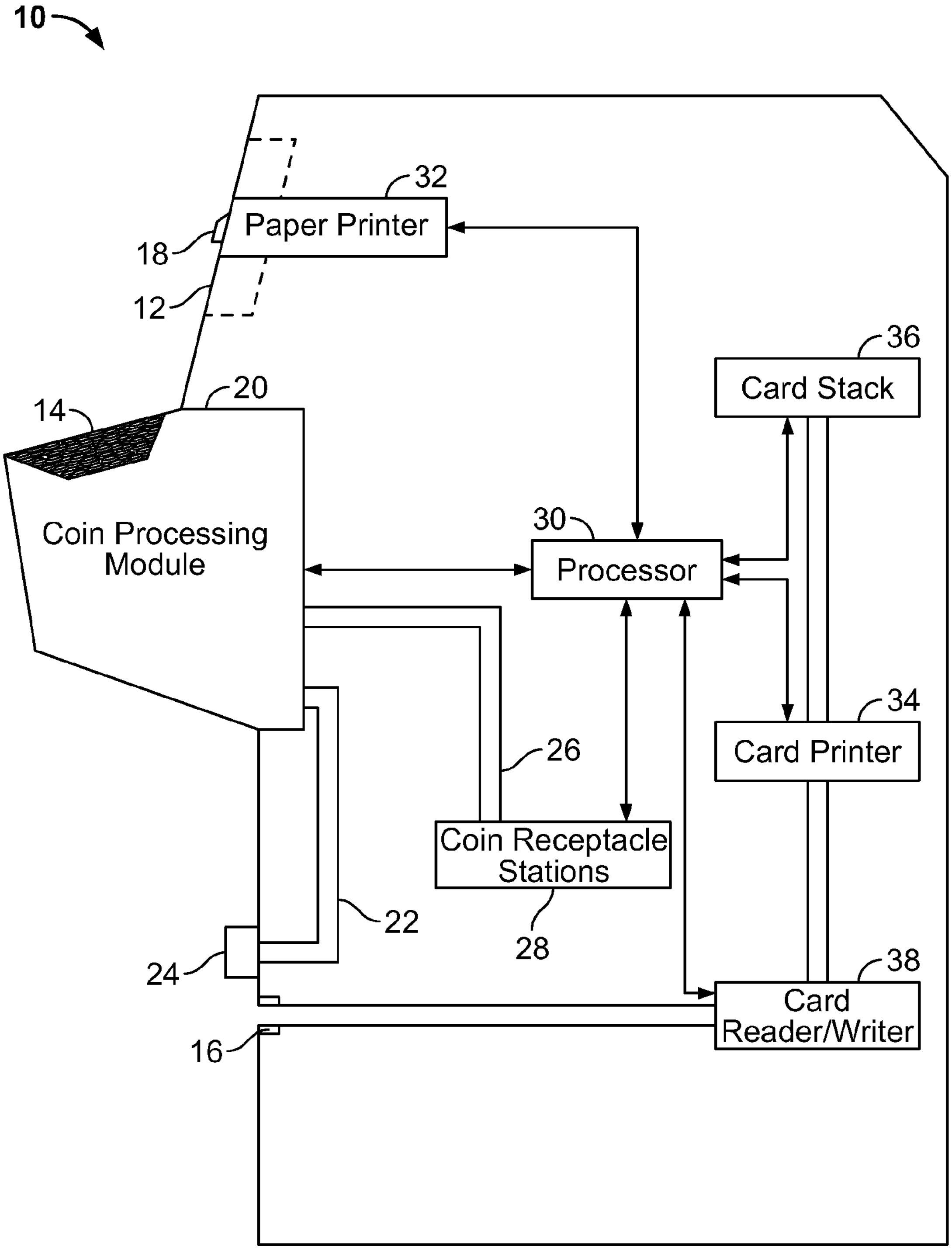
FIG. 2 is a side view of the coin redemption machine shown in FIG. 1 which schematically illustrates the components present in the coin redemption machine according to one embodiment of the present invention.

FIG. 2 illustrates a side view of the coin redemption machine 10. FIG. 1 and FIG. 2 are intended to illustrate one non-limiting example for a configuration of the components of the coin redemption machine 10. The coin redemption machine 10 includes a coin processing module 20. The coin processing module 20 counts and authenticates coins of mixed denominations that are deposited in the coin input area 14, which leads directly into the coin processing module 20. The coins may also be sorted in the coin processing module 20 in a variety of ways such as by sorting based on the diameter of the coins. When a coin cannot be authenticated by the coin processing module 20, that coin is directed through a coin reject tube 22 to the rejected coin receptacle 24 which allows the user who deposited such a non-authenticated coin to retrieve the coin by accessing the rejected coin receptacle 24. Alternatively, non-authenticated coins may be routed to a reject coin bin (not shown) disposed within the coin redemption machine 10 and are not returned to the user.

Disk-type coin sorters and authenticating devices which can perform the function of the coin processing module 20 of the coin redemption machine 10 are disclosed in U.S. Pat. No. 5,299,977 (entitled "Coin Handling System"); U.S. Pat. No. 5,453,047 (entitled "Coin Handling System"); U.S. Pat. No. 5,507,379 (entitled "Coin Handling System with Coin Sensor Discriminator"); U.S. Pat. No. 5,542,880 ("Coin Handling System with Shunting Mechanism"); U.S. Pat. No. 5,865,673 (entitled "Coin Sorter"); and U.S. Pat. No. 5,997,395 (entitled "High Speed Coin Sorter Having a Reduced Size"); each of which is incorporated herein by reference in its entirety. In general, in such disc-type systems, a batch of coins are input by a user into a coin input area comprising a coin tray or coin receptacle area (e.g., a funnel, hopper, etc.) or other area adapted to receive input coins, where they are conveyed to a central region of a rotating, resilient pad. As a disc bearing the resilient pad is rotated at a high speed (e.g., by a shaft or gear train and electric motor), coins deposited on the resilient pad slide outwardly over the surface of the pad due to centrifugal force (i.e., they are subjected to sufficient centrifugal force to overcome their static friction with the upper surface of the resilient pad) and a stationary sorting head disposed adjacent and opposite to the resilient pad guides coins of specific denominations, via contours (e.g., walls, grooves, rails, etc.) formed therein, to designated exit stations, where they are each discharged through an exit slot specific to the denomination of the coin.

Alternatively, other coin sorters such as, for example, rail sorters can be used to perform the function of the coin processing module 20. A rail sorter suitable to perform the function of the coin processing module 20 of the coin redemption machine 10 according to an alternative embodiment of the present invention is described in U.S. Pat. No. 5,382,191 (entitled "Coin Queuing Device and Power Rail Sorter"), which is incorporated herein by reference in its entirety. Alternatively, the coin sorter may comprise a gravity rail sorter, such as that disclosed by Molbak in U.S. Pat. No. 6,976,570, which is incorporated herein by reference in its entirety, a powered rail sorter, a multi-disc or disc-to-disc sorter, or other type of bulk coin processing mechanism or system.

The coin processing module 20 outputs the authenticated coins via one or more exit channels (not shown). According to one embodiment, each coin exit channel is coupled to a coin tube 26 which is coupled to a coin receptacle station 28. The coin tubes 26 lead to coin receptacle stations (or bins) 28 for each of the coin denominations that are to be sorted and authenticated by the coin processing module 20. The coin receptacle station 28 includes coin bags or bins for holding each sorted coin denomination. Other coin distribution schemes are implemented in alternative embodiments of the present invention. Many alternative coin distribution schemes are described in greater detail in U.S. Pat. No. 6,318,537 entitled "Currency Processing Machine with Multiple Internal Coin Receptacles," which is incorporated herein by reference in its entirety.

In an alternative embodiment of the coin redemption machine 10, the coin processing module 20 only counts the coins and does not store the coins in a sorted fashion. Or, the coin processing module 20 may tabulate the value of the coins that are processed without ever sorting them. In either of these situations, the coins are sent from the coin processing module 20 to a single coin receptacle station 28 as mixed coins. Because the coins are not being sorted by denomination, the coin redemption machine 10 only requires one receptacle station 28 for collecting all of the mixed coins.

The currency redemption machine 10 includes a processor 30 which is coupled to and controls the interaction between the coin processing module 20, the touch screen 12, a paper printer 32 for outputting a receipt or voucher via the document slot 18, a card printer 34 for printing a user selected graphic on a value card, a card stack 36 for providing value cards to the card printer 34, and a card reader/writer device 38 for reading data from or writing data to a value card. For example, the processor 30 may review the input totals from the coin processing module 20, receive the user's selections via the touch screen 12, direct the card stack 36 to transport a value card to the card printer 34, direct the card printer 34 to print a graphic corresponding to the user's selections on the touch screen 12, direct the card reader/writer 38 to assign a monetary value to the value card corresponding to the input totals from the coin processing module 20, and direct the paper printer 32 to output a receipt indicative of the input totals from the coin processing module 20.

Figure 3:
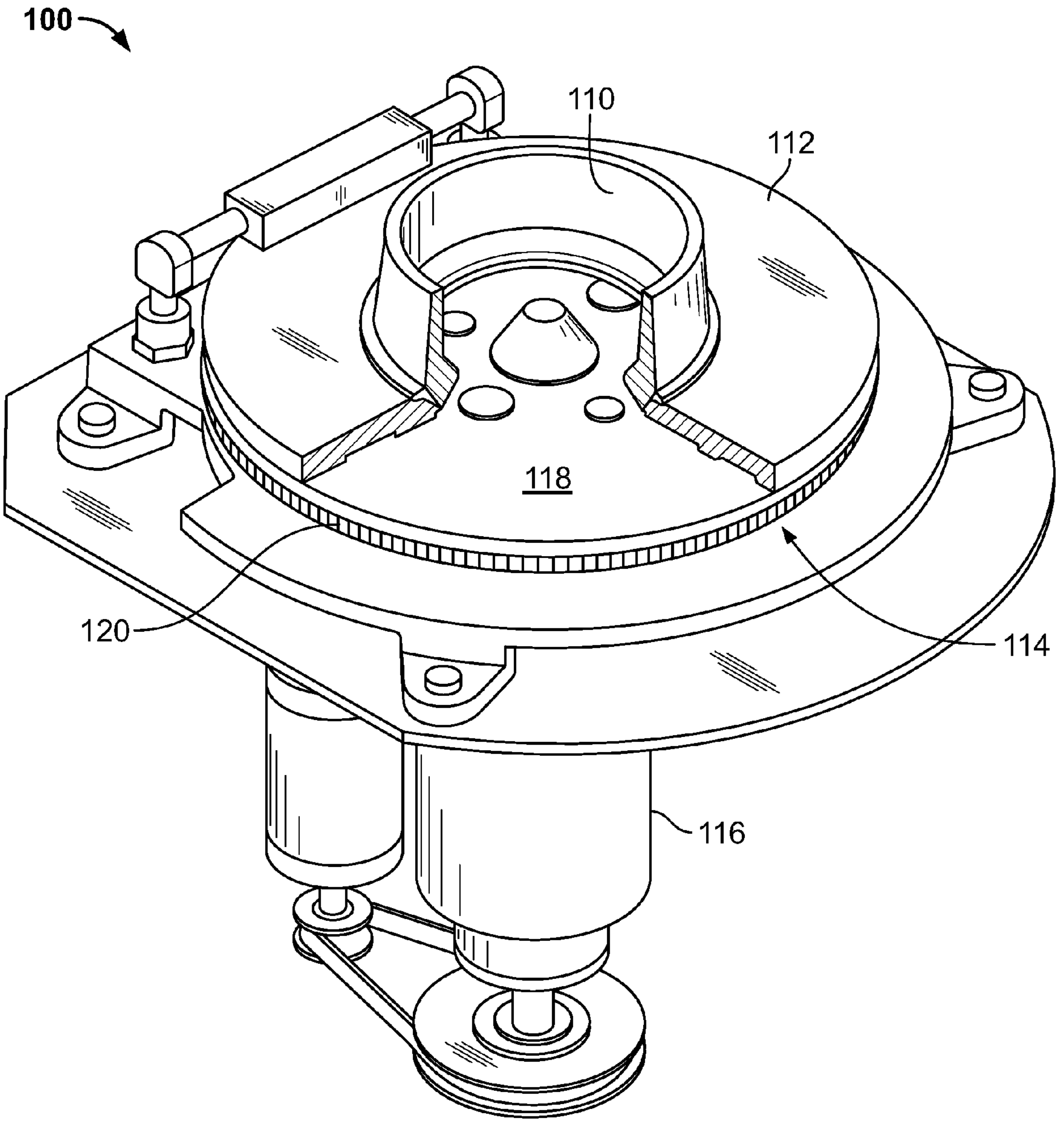
FIG. 3 is a perspective view of a coin processing system for use with the coin redemption machine of FIG. 1, according to one embodiment of the present invention, with portions thereof broken away to show the internal structure.

Referring now to FIG. 3, a disk-type coin processing system 100 is shown which can be used as the coin processing module 20 of FIG. 2 according to one embodiment of the present invention. The coin processing system 100 includes a hopper 110 for receiving coins of mixed denominations that feeds the coins through a central opening in an annular sorting head 112. As the coins pass through this opening, they are deposited on the top surface of a rotatable disk 114. This rotatable disk 114 is mounted for rotation on a shaft (not shown) and is driven by an electric motor 116. The disk 114 typically comprises a resilient pad 118, preferably made of a resilient rubber or polymeric material, bonded to the top surface of a solid disk 120. While the solid disk 120 is often made of metal, it can also be made of a rigid polymeric material.

According to one embodiment, coins are initially deposited by a user in a gravity-feed coin tray (e.g., coin input area 14 of FIG. 1) disposed above the coin processing system 100. Coin flow through an aperture in the gravity-feed coin tray which funnels the coins into the hopper 110. Alternatively, a pivoting coin tray can be used in other embodiments of the present invention. The user lifts the pivoting coin tray which funnels the coins into the hopper 110. A pivoting coin tray suitable for use in connection with the coin processing system 100 is described in detail in U.S. Pat. No. 4,964,495 (entitled "Pivoting Tray for Coin Sorter"), which is incorporated herein by reference in its entirety.

As the disk 114 is rotated, the coins deposited on the resilient pad 118 tend to slide outwardly over the surface of the pad 118 due to centrifugal force. As the coins move outwardly, those coins that are lying flat on the pad 118 enter the gap between the surface of the pad 118 and the sorting head 112 because the underside of the inner periphery of the sorting head 112 is spaced above the pad 118 by a distance which is about the same as the thickness of the thickest coin. As is further described below, the coins are processed and sent to exit stations where they are discharged. The coin exit stations may sort the coins into their respective denominations and discharge the coins from exit channels in the sorting head 112 corresponding to their denominations.

Figure 4:
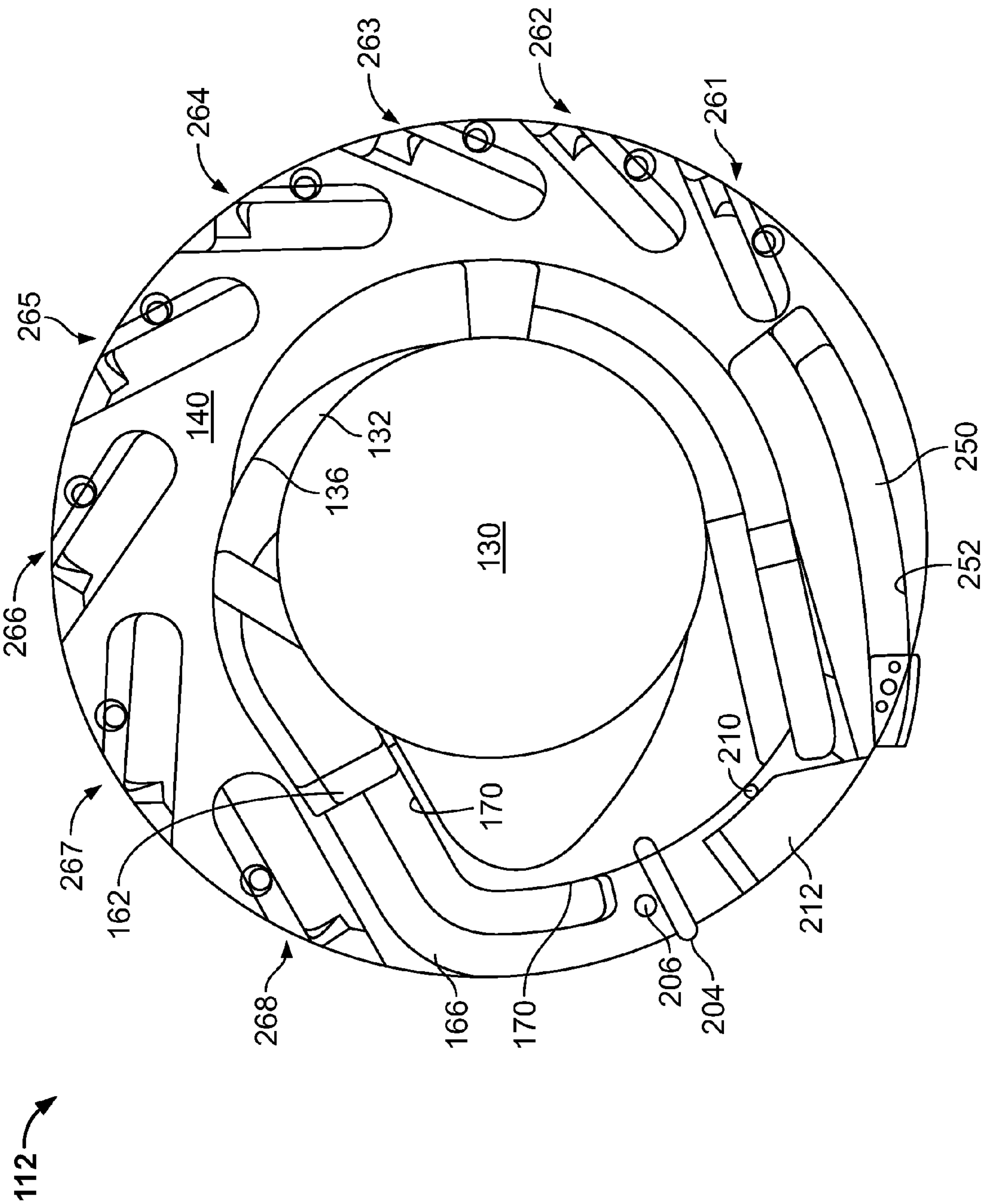
FIG. 4 is an enlarged bottom view of a sorting head for use with the coin processing system of FIG. 3 according to one embodiment of the present invention.

Referring now to FIG. 4, the underside of the sorting head 112 is shown. The coin sets for any given country are sorted by the sorting head 112 due to variations in the diameter size. The coins circulate between the sorting head 112 and the rotating pad 118 (FIG. 1) on the rotatable disk 114 (FIG. 1). The coins are deposited on the pad 118 via a central opening 130 and initially enter the entry channel 132 formed in the underside of the sorting head 112. It should be keep in mind that the circulation of the coins in FIG. 4 appears counter-clockwise because FIG. 2 is a view of the underside of the sorting head 112.

An outer wall 136 of the entry channel 132 divides the entry channel 132 from the lowermost surface 140 of the sorting head 112. The lowermost surface 140 is preferably spaced from the pad 118 by a distance that is slightly less than the thickness of the thinnest coins. Consequently, the initial outward radial movement of all the coins is terminated when the coin engage the outer wall 136, although the coins continue to move more circumferentially along the wall 136 (in the counterclockwise directed as viewed in FIG. 2) by the rotational movement imparted to the coins by the pad 118 of the rotatable disk 114.

As the pad 118 continues to rotate, those coins that were initially aligned along the wall 136 move across the ramp 162 leading to the queuing channel 166 for aligning the innermost edge of each coin along an inner queuing wall 170. The coins are gripped between the queuing channel 166 and the pad 118 as the coins are rotated through the queuing channel 166. The coins, which were initially aligned with the outer wall 136 of the entry channel 130 as the coins move across the ramp 162 and into the queuing channel 166, are rotated into engagement with inner queuing wall 170. As the pad 118 continues to rotate, the coins which are being positively driven by the pad move through the queuing channel 166 along the queuing wall 170 passed a trigger sensor 206 and a discrimination sensor 204 for discriminating between valid and invalid coins. In other embodiments, the discrimination sensor also determines the denomination of the coins. The trigger sensors 206 sends a signal to the discrimination sensor 204 that a coin is approaching.

Coins determined to be invalid are rejected by a diverting pin 210 which is lowered and impacts an invalid coin to redirect the invalid coin to the reject channel 212 that guides the rejected coins to a reject chute 22 (FIG. 2), which directs the coin back to the user. The diverting pin 210 remains in its home, or non-diverting position, until an invalid coin is detected. Those coins not diverted into the reject channel 212 continue along inner queuing wall 170 to the gauging region 250. The inner queuing wall 170 terminates just downstream of the reject channel 212; thus, the coins no longer abut the inner queuing wall 170 at this point and the queuing channel 166 terminates. The radial position of the coins is maintained, because the coins remain under pad pressure, until the coins contact an outer wall 252 of the gauging region 250.

The gauging wall 252 aligns the coins along a common radius as the coins approach a series of coin exit channels 261-268 that discharge coins of different denominations. The first exit channel 261 is dedicated to the smallest coin to be sorted (e.g., the dime in the U.S. coin set). Beyond the first exit channel 261, the sorting head 112 shown in FIG. 2 forms seven more exit channels 261-268 which discharge coins of different denominations at different circumferential locations around the periphery of the sorting head 112. Thus, the exit channels 261-268 are spaced circumferentially around the outer periphery of the sorting head 112 with the innermost edges of successive channels located progressively closer to the center of the sorting head 112 so that coins are discharged in the order of decreasing diameter. The number of exit channels can vary according to alternative embodiments of the present invention.

The innermost edges of the exit channels 261-268 are positioned so that the inner edge of a coin of only one particular denomination can enter each channel 261-268. The coins of all other denominations reaching a given exit channel extend inwardly beyond the innermost edge of that particular exit channel so that those coins cannot enter the channel and, therefore, continue on to the next exit channel under the circumferential movement imparted on them by the pad 118. To maintain a constant radial position of the coins, the pad 118 continues to exert pressure on the coins as they move between successive exit channels 261-268.

Further details of the operation of the sorting head 112 shown in FIG. 4 are disclosed in U.S. patent application Ser. No. 10/095,164 (entitled "Disk-Type Coin Processing Device Having Improved Coin Discrimination System"), which was filed on Mar. 11, 2002 and is incorporated herein by reference in its entirety.

Figure 5:
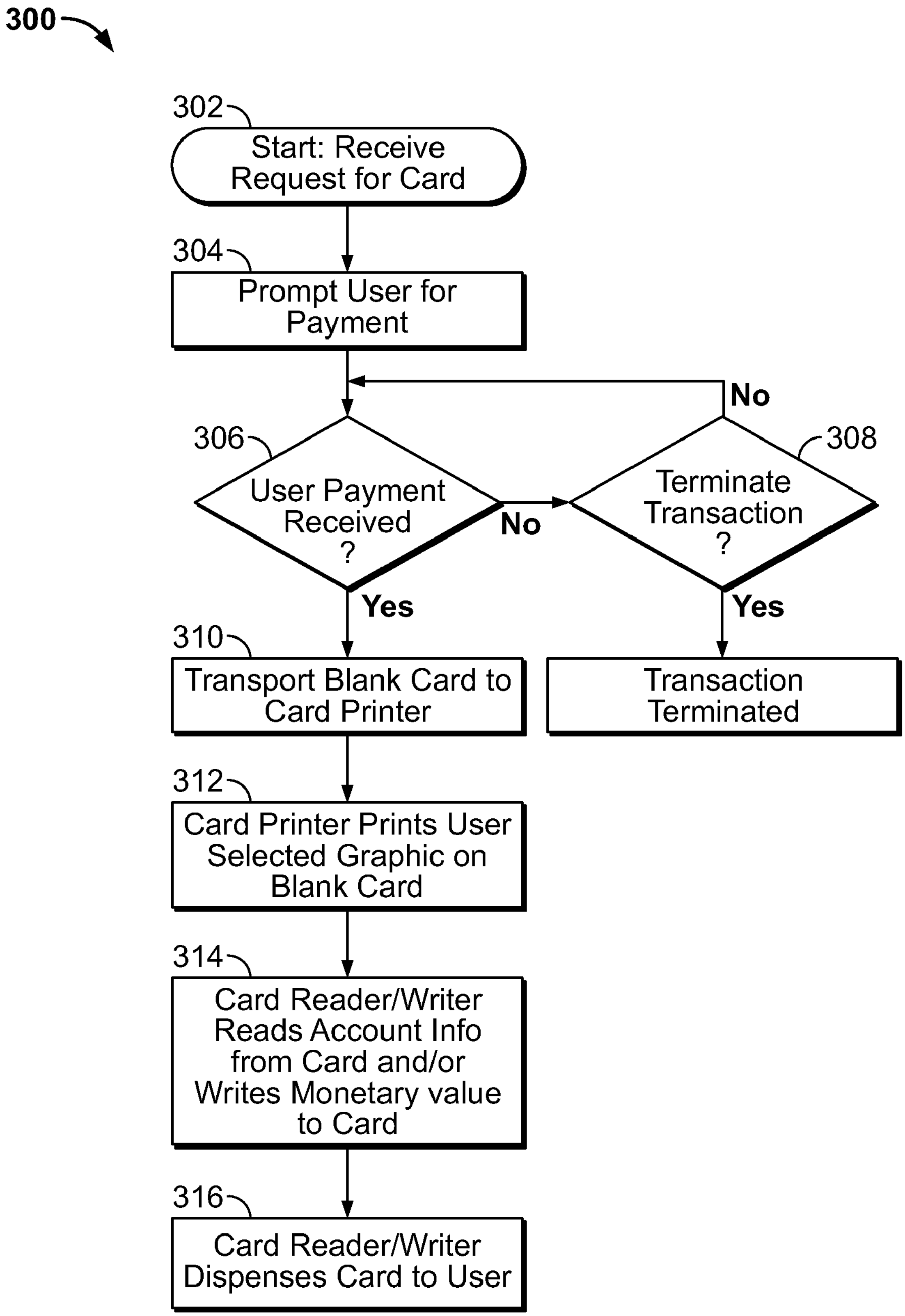
FIG. 5 is a flow diagram illustrating a routine for dispensing a card in accordance with an embodiment.

FIG. 5 is a flow diagram illustrating a routine for dispensing a selected value card to a user with the coin redemption machine 10 of FIG. 1 and FIG. 2 in accordance with one embodiment. In one aspect of this embodiment, the routine 300 may be carried out by the processor 30 (FIG. 2) according to computer-executable instructions stored on a computer-readable medium such as, for example, a main memory (e.g., a random access memory (RAM) or other dynamic storage device), a read only memory (ROM) or other static storage device, magnetic disk, optical disk, hard disk, CD-ROM, DVD, PROM, EPROM, FLASH-EPROM, memory chip, solid state device, or any other medium from which a computer can read data. While the embodiments are described with respect to a processor, it is contemplated that other suitable means may be provided for implementing routine 300 such as, for example, controller(s), multiple processors, networked computers, combinations thereof, or the like. Additionally, the computer-executable instructions may be stored externally on, for example, one or more computers, networks, servers, or remote computers.

According to the illustrated embodiment, the routine 300 starts when the processor 30 receives a request for a particular type of value card at block 302. This request may be initiated by the user making selections or inputs on the touch screen 12. The user selections and inputs may include, but are not limited to, the number of valued cards to be purchased, types of value cards, redeemable dollar amounts applied to the value cards, graphics printed on value cards, and whether the user desires a voucher for the excess money deposited over the redeemable dollar amounts associated with the card.

For example, the touch screen 12 may prompt the user to select a type of value card and a dollar amount to be associated with the purchased value card. The dollar amount may be a predefined fixed amount (e.g., $5, $10, $20, $50, etc.), a user selected amount, or an unlimited amount (i.e., all money input by the user is applied to the value card). If the dollar amount is a predefined fixed amount or a user selected amount, the coin redemption machine 10 may reject and return any coins deposited by the user that exceed the predefined fixed amount or the user selected amount. Alternatively, the paper printer 32 may output a voucher, which is redeemable for the money deposited by the user that exceeded the predefined fixed amount or the user selected amount. The voucher is typically redeemed by an attendant at the store where the coin redemption machine 10 is located. It is contemplated that in some embodiments the coin redemption machine 10 may dispense banknotes and/or coins to the user the for excess amounts of deposited money.

The touch screen 12 may then prompt the user to select or customize a graphic to be printed on the value card. The available graphics may be stored within the coin redemption machine 10 and it is contemplated that each type of value card may have a plurality of associated graphics for the user to choose from. Alternatively, the graphics may be provided to or otherwise acquired by the coin redemption machine 10 as will be described in further detail below. It is further contemplated that in a single purchasing session, the coin redemption machine 10 may be advantageously configured to permit a user to purchase multiple value cards of different card types having different associated redeemable dollar amounts.

In response to the card request, in block 304, the routine 300 prompts the user for payment for the card. The user makes payment by depositing coins in the coin input area 14, which are then authenticated and counted by the coin processing module 20 as previously described. In decision block 306, the routine 300 determines if payment for the card has been received from the user. If payment has not been received, then in decision block 308 the routine 300 determines whether the transaction should be terminated. In some embodiments, the routine 300 can elect to terminate the transaction based on the amount of time that has elapsed without receiving payment from the user. In other embodiments, termination can be based on other factors, such as user termination input or lack of a user response to an appropriate prompt. If, however, the routine 300 determines that the transaction should not be terminated, then the routine 300 can continue to wait for user payment or it can again prompt the user for payment.

Once the routine 300 confirms that user payment was received, then in block 310 the routine signals the card stack 36 to transport a value card (e.g., a blank or partially blank value card) to the card printer 34 through an appropriate transport mechanism (e.g., open or closed belt drive system, carriage system, movable grippers, suction-based pick and place mechanism, rollers, etc.). One suitable card printer may include the model CPS71 O.F. (Open Frame) manufactured by CTS North America, based in Burlington, Mass., which provides dual side printing at 300 dpi full color printing. As another example, the Zebra P330i and P430i card printers, manufactured by Zebra Card Printer Solutions, based in Camarillo, Calif., could be used. Still further, a Dualys 3 Dual Sided Printer, optionally with a Dualys MAG upgrade option (printer with HICO/LOCO magnetic stripe encoder) and/or SMART printer with smart card contact station, manufactured by Evolis Inc of Fort Lauderdale, Fla., could be used. In yet another example, the card printer may comprise a Datacard® SP55k kiosk card printer from the Datacard Group, based in Minnetonka, Minn., which provides configurations for simplex card issuance (one-sided, full color card printing) and duplex card issuance (two-sided, full color card printing). These card printers are each capable of printing, for example, high resolution text, photos, images, logos, and barcodes Further, the card printer 34 may advantageously comprise one or more of a ISO magnetic strip encoder (e.g., dual HICO/LOCO (High Coercivity/Low Coercivity); IAT (Tracks 1, 2 and 3) or NTT (1 Track), a smart card contact station (e.g., compatible with chip cards such as ISO 7816-2 Chip Cards), and/or a contactless smart card read station. The card hopper(s) may optionally be configured to output an alarm, such as by an RF signal or modem transmission, when one or more predetermined limits have been reached to inform an local monitoring system, a local attendant, or a remote monitoring system of the status of the card hopper(s).

Any suitable means for transporting the value card from the card stack 36 to the card printer 34 may be utilized including, but not limited to, driven rollers or driven belts and may further or alternatively utilize a gravity feed dispenser with physical guides to guide the movement of the card under the influence of gravity.

In some embodiments, a physical registration device (e.g., one or more movable or retractable pin(s) configured to contact an edge or edges of a conveyed card, etc.) or optical registration devices (e.g., a laser registration device) are advantageously, but optionally, provided to register a value card relative to the card printer 34 and may be integral with the card printer. The registration device ensures that the print area of a value card is properly aligned within the card printer 34. Additionally, one or more sensor(s) are provided to output signals corresponding to a position of a card or a state of a device in the system such as, but not limited to, whether a card has jammed (e.g., an optical sensor disposed along a card path to register passage of a card, a motor current sensor to sense a current draw from a motor, etc.), a level sensor configured to monitor inventory in a card stack, etcetera.

In block 312, routine 300 signals to the card printer 34 to print a graphic corresponding to a selected card type or other user selections made at block 302. Non-limiting examples of suitable card printers 34 include EDIsecure XID 430 and EDIsecure XID 440 manufactured and sold by Digital Identification Solutions, LLC. In some embodiments, an error detection means may be provided for ensuring that the graphic was properly printed. If an improperly printed card is detected, the improperly printed card may be discarded and the processor 30 may revert to block 310 to reattempt the card printing on a new value card.

In block 314, routine 300 signals the card printer 34 to transport the value card to the card reader/writer device 38 by a suitable transport means such as, for example, conveyor(s) or driven rollers. It is contemplated that the card printer 34 may include a card reader/writer 38 obviating the need to transport the value card between the card printer 34 and card reader/writer 38.

In some embodiments, the card reader/writer device 38 writes a monetary value to a media feature of the value card. In other embodiments, the card reader/writer device 38 reads a user account number from the media feature of the value card or writes a user account number to the media feature after receiving the account number from a third party. In these embodiments, the coin redemption machine may include a data communication means for communicating a monetary value associated with the account number to an external database maintained on a network, server, remote computer, combinations thereof, or the like. Non-limiting examples of suitable data communication means include modems communicating by telephone network, Intranet, Internet, Local Area Network (LAN), Ethernet, wireless communications, combinations thereof, and/or the like. The data communication means may also facilitate requests for and reception of an account number from a third party prior to writing the account number to the media feature of the value card. It is contemplated that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like. It is further contemplated that an error detection means (not shown) may be provided to ensure that data was properly written to or read from the value card. If an error is detected, the routine 300 may revert to block 310 to repeat the process of dispensing a value card.

After the card reader/writer device 38 has successfully processed a card, the routine 300 may signal the card reader/writer device 38 to transport the card to the card slot 16. This may be accomplished by any suitable means including, but not limited to, a conveyor(s), driven rollers, or a gravity fed chute (not shown) from the card reader/writer device 38 to the card slot 16. Although the card slot 16 is shown in a lower portion of the coin processing machine 10, the card slot can be disposed in other locations of the coin processing machine, including in the upper portion thereof. It is contemplated that sensors (not shown) may be provided at the card slot 16 to ensure that the purchased value card is successfully dispensed to the user. Accordingly, the routine 300 can repeat the foregoing card dispensing sequence until a value card has been properly printed by the card printer 34 and properly processed by the card reader/writer device 38. In some embodiments, a threshold number of attempts may be set before an error message is generated indicating a malfunctioning coin redemption machine 10.

The foregoing description of the embodiment illustrated in FIG. 5 is not intended to be exhaustive or to limit the scope of the invention as those of ordinary skill in the relevant art will recognize. It is contemplated that in alternative embodiments many of the functions described with respect to FIG. 5 may be performed in a different order or substantially concurrently without departing from the spirit and scope of the present disclosure. For example, it is contemplated that blocks 304, 306, and 308 may be executed before or concurrently with block 302 (i.e., the routine 300 may be initiated by either inputting coins 304 or by a card request 302). In such embodiments, the processor 30 initiates block 310 only after confirming that both block 302 and block 306 have been completed (i.e., a value card is transported to the card printer only when both payment is received 306 and the user has completed a card request 302). It is further contemplated that, in some embodiments, routine 300 may signal the card stack 36 to transport a value card to the card printer 34 after a previous value card was printed by the card printer 34 (i.e., a value card is always in the card printer 34) so as to prime the system and expedite a subsequent transaction.

Figure 6:
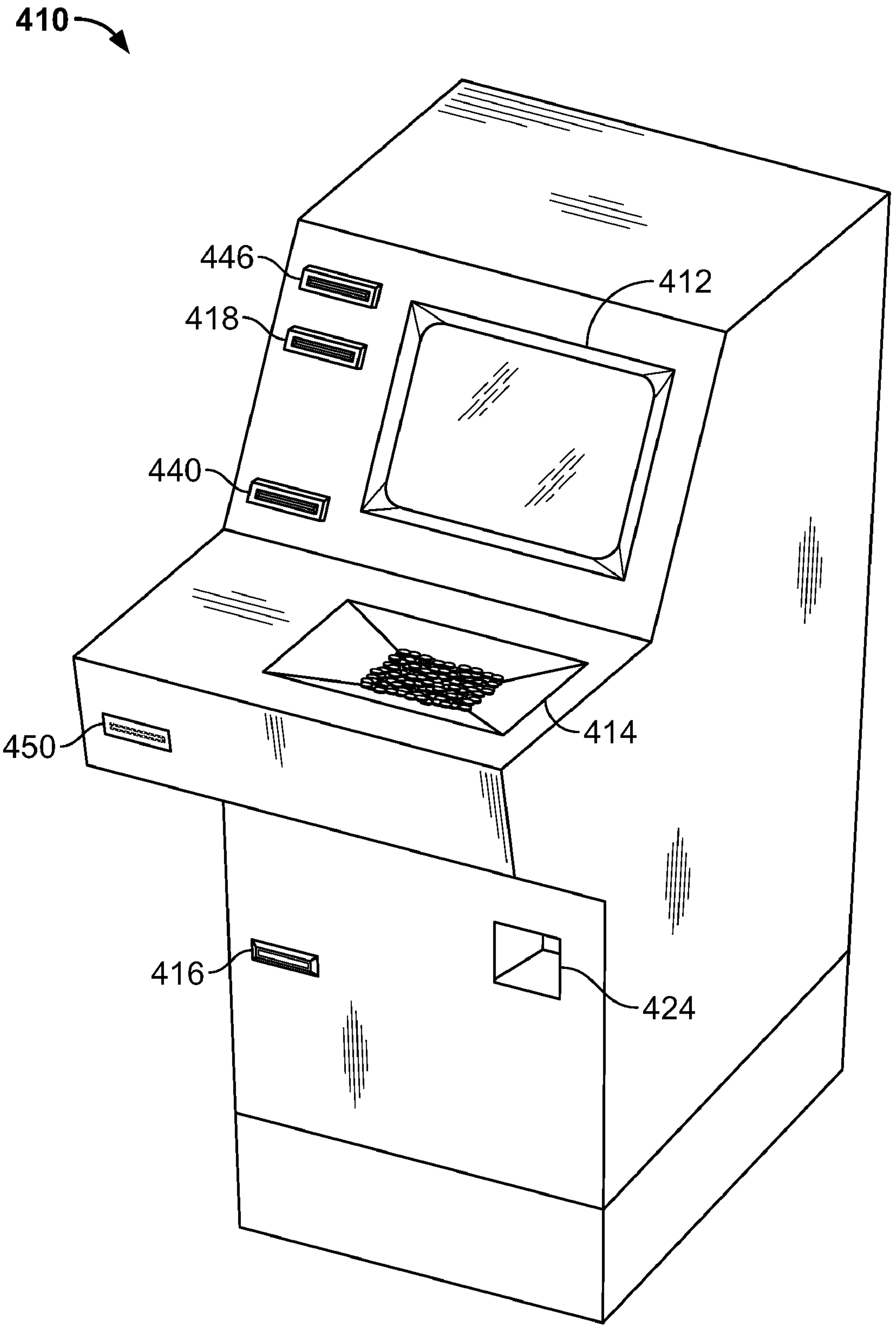
FIG. 6 is a perspective view of a coin redemption machine according to another embodiment of the present invention.
Figure 7:
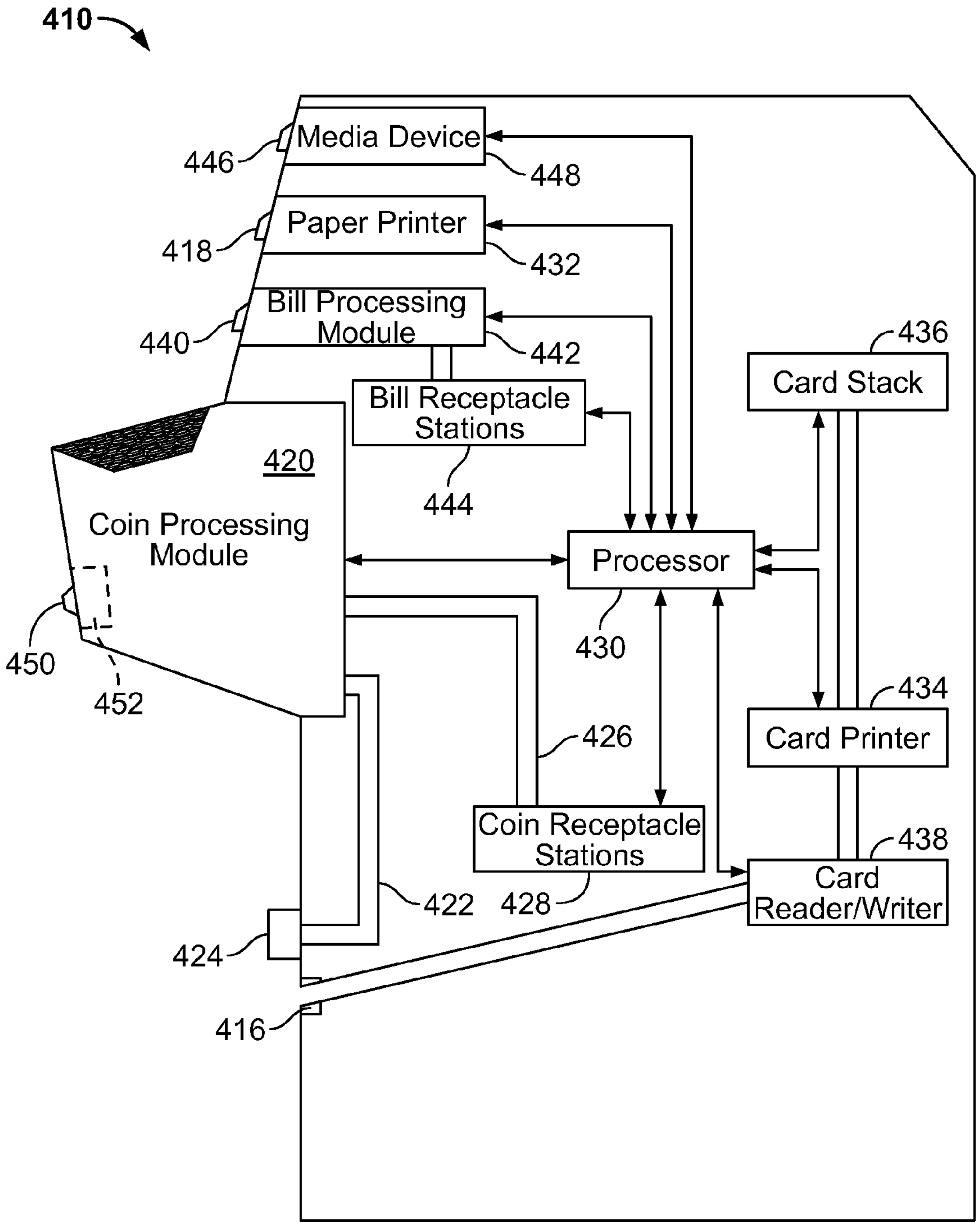
FIG. 7 is a side view of the coin redemption machine shown in FIG. 6 which schematically illustrates the components present in the coin redemption machine according to another embodiment of the present invention.

FIG. 6 and FIG. 7 illustrate a coin redemption machine 410 according to another embodiment. FIG. 6 and FIG. 7 further illustrate one non-limiting example for a configuration of the components of the coin redemption machine 410. As previously described with respect to the coin redemption machine 10 of FIG. 1 and FIG. 2, the coin redemption machine 410 includes a touch screen 412, a coin input area 414, a card slot 416, a document slot 418, a coin processing module 420, a coin reject tube 422, a rejected coin receptacle 424, a coin tube 426, a coin receptacle station (or bins) 428, a processor 430, a paper printer 432, a card printer 434, a card stack 436, and a card reader/writer device 438.

The coin redemption machine 410 also includes a bill slot 440 into which the user may insert banknotes. The bill slot 440 is coupled to a bill processing module 442 (FIG. 7) that is capable of authenticating and counting banknotes inserted through the bill slot 442 into the coin redemption machine 410. The bill processing module 442 is coupled to the processor 430 to communicate the dollar amount of the authenticated and counted banknotes. The processor 430 maintains an input total, which is the dollar amount of all money (coins, banknotes, or other storage media bearing or being associated with a value) deposited by a user. The bill processing module 442 is also coupled to a bill receptacle station 444 that is configured to store the authenticated and counted banknotes.

The coin redemption machine 410 further includes a storage media slot or port 446 into which the user may insert various forms of media such as, for example, a bank card, a credit card, a loyalty card, an identification card including the type distributed by grocery stores, value card, or the like. The storage media slot 446 is coupled to a storage media reader/writer device 448 (FIG. 7) in the coin redemption machine 410 that is capable of reading from or writing to one or more of the various forms of storage media. The storage media may include various types of data storage technology such as, for example, memory chips, bar codes, magnetic strips, radio frequency tags, embedded integrated circuits, optical devices, solid state memory devices, combination thereof, or the like. Some forms of storage media may require the touch screen 412 to prompt the user to carry out a series of actions for identifying the user by displaying certain commands and requesting that the user depress touch keys on the touch screen 412 (e.g., a user PIN, account number, etc.). The coin redemption machine may further include a data communication means (not shown) to access account information corresponding with account numbers stored on the media being read by the storage media reader/writer device 448. Non-limiting examples of suitable data communication means include modems capable of accessing telephone networks, the internet, intranets, servers, remote computers, combinations thereof, or the like. The storage media reader/writer device 448 is also coupled to the processor 430 to, amongst other things, allow the user to add additional dollar amounts to the input total maintained by the processor 430.

The capability of the coin redemption machine 410 to accept banknotes and/or other forms of money in addition to coins may be advantageous because a user may desire to purchase a value card worth a specific amount but may not have the appropriate amount of coins. Additionally, the user may not initially know how many coins the user had or the transaction costs associated with the coin redemption machine 410. Thus, the user is able to “top off” or round up the input total to a desired dollar amount by depositing banknotes through the bill slot 440 or a credit card through the storage media slot 446.

It is contemplated that the storage media slot 446 may be configured to accept value cards, which the storage media reader/writer device 448 is configured to read data from or to which the storage media reader/writer device is configured to write data. In at least some aspects of the present concepts, the processor 430 is configured to cause the balance of an input value card to be communicated to the user, such as by the touch screen 412, and the user may add additional funds to the input value card. The adding of value to the value card, also known as reloading, can be achieved, in some aspects, by the input of value into the transaction via one or more bills inserted into the bill slot 440 and/or coins input into the coin input area 414. Alternatively, the customer may be provided still additional options to add value to the transaction from other sources including, but not limited to input documents input into a document processing module (e.g., a check imaging device configured to image a check, read MICR data, perform OCR, etc.), transferred from an account (e.g., a bank account), transferred from a credit source (e.g., a personal credit card), or transferred from a personal electronic device (e.g., an electronic wallet, cellular phone, IC device, solid state memory device, etc.), or even precious metals (e.g., a scale in combination with a spectroscopy device, such as a Skyray Instrument Inc., EDX 600 XRF or EDX 3000, manufactured in Braintree, Mass.). In a configuration involving precious metals, the coin redemption system would necessarily need to determine an exchange rate at the time of the transaction, such as by accessing the New York Spot Price or World Spot Price on-line. If an entire value of a transaction is transferred to a target location other than a value card, thereby avoiding the need to print a new value card, the cost of printing the card is avoided. Thus, the cost of operating the coin redemption machine is reduced because fewer materials (e.g., new cards, printer ink, etc.) and less frequent service (e.g., restocking services) are required. In at least one aspect of the present concepts, such printing savings may optionally be passed on to the patron in whole or in part in the form of a reduced transaction fee. To enable a customer to more efficiently utilize one or more additional value card(s), credit card, smart cards, or the like to complete a transaction involving the inputting of multiple cards (e.g., using an input debit card to transfer value to an input value card), multiple storage media reader/writer devices are optionally provided. For example, two card reading/writing devices may be provided to avoid the need for a patron to perform multiple steps of removing and inserting cards to add value from a first card to a second card. However, in another configuration, a single card reading/writing device is provided and the patron is provided instructions for the sequential use of the card reading/writing device, such as to remove one card and insert the next card.

The coin redemption machine 410 further includes, in at least some configurations, one or more storage media slots comprising digital media slots or ports 450 into which the user may insert various forms of digital media are provided, from which data is read by a digital media reading device 452 (FIG. 7) appropriate to the configuration of the digital media slot or port and expected device received thereby. The digital media reader/writer device 452 is optionally capable of writing to the digital media inserted by the user through the digital media slot or port. Such digital media slots or ports 450 and associated digital media reading device(s)/writing device(s) are configured to read data from (and write to) an inserted digital media device, such data including, for example, a user-selected graphic to be printed onto a value card, or a value or account information stored on the digital media device. User-selected graphic, as used herein, is intended to mean any image, picture, drawing, symbol, representation, diagram, geometric design, photograph, or other visual representation. Non-limiting examples of suitable digital media include CD-ROMs, flash drives, floppy disks, DVD-ROMS, USB storage devices, solid state memory devices (e.g., memory sticks, thumb drives, etc.), cell phone SIM cards, ICs, combinations thereof, or the like. The digital media reader/writer 452 is also coupled to the processor 430 to receive data (e.g., a graphic, a picture, etc.) from the inserted digital media and provide the data (e.g., graphic) to another local device, such as the touch screen 12 and/or to the card printer 434 for printing onto a value card, or to a remote device, such as a bank account.

It is contemplated that other means may be provided to allow a user to acquire additional graphics to print on a value card. For example, the coin redemption machine 410 may include a data communication means such as, for example, a modem, configured to access the internet, an intranet, an external server, an external network, a remote computer, combinations thereof, or the like to acquire graphics. Thus, a patron may access a personal photo account on a photo sharing site such as Flickr or Snapfish. Additionally, the coin redemption machine 410 may include a wireless connectivity capability such as, for example, Bluetooth, Wi-Fi, or other near-field communications to allow a user to transmit and receive data including, but not limited to, the uploading of a graphic from a user's compatible wireless device (e.g., cell phone) to the coin redemption machine 410.

It is further contemplated that the data communication means may be utilized by machine owners or operators to remotely manage the value card types, graphics, and other options available to the user. For example, the owners or operators of the coin redemption machines 410 may desire to run a marketing campaign and, thus, may change the available graphics for a specific card type to reflect this marketing campaign. It is yet further contemplated that the data communications means may be utilized by owners or operators to remotely acquire product trend information such as, for example, quantities of specific card types purchased. This is advantageous because the coin redemption machines disclosed herein give owners the ability to acquire product information which can be used to target specific merchants to create dynamic marketing campaigns, and then remotely implement those campaigns immediately without having to restock the numerous machines.

The user may use the touch screen 12 to customize default graphics stored within the coin redemption machine 410, graphics provided to the coin redemption machine 410 via digital media, or graphics otherwise acquired by the coin redemption machine 410. Non-limiting examples of graphic customization functions include cropping, sizing, coloring, text inserts, rotation, image enlargement, and/or the like. Additionally, the user may be able to add personalized messages to the graphics. This may be advantageous because users intending to give the purchased value card as a gift can customize the graphic according to the occasion or intended recipient. It is contemplated that the graphic printed on the value card may be a combination of stored default graphics, user provided graphics, and/or acquired graphics.

Figure 8:
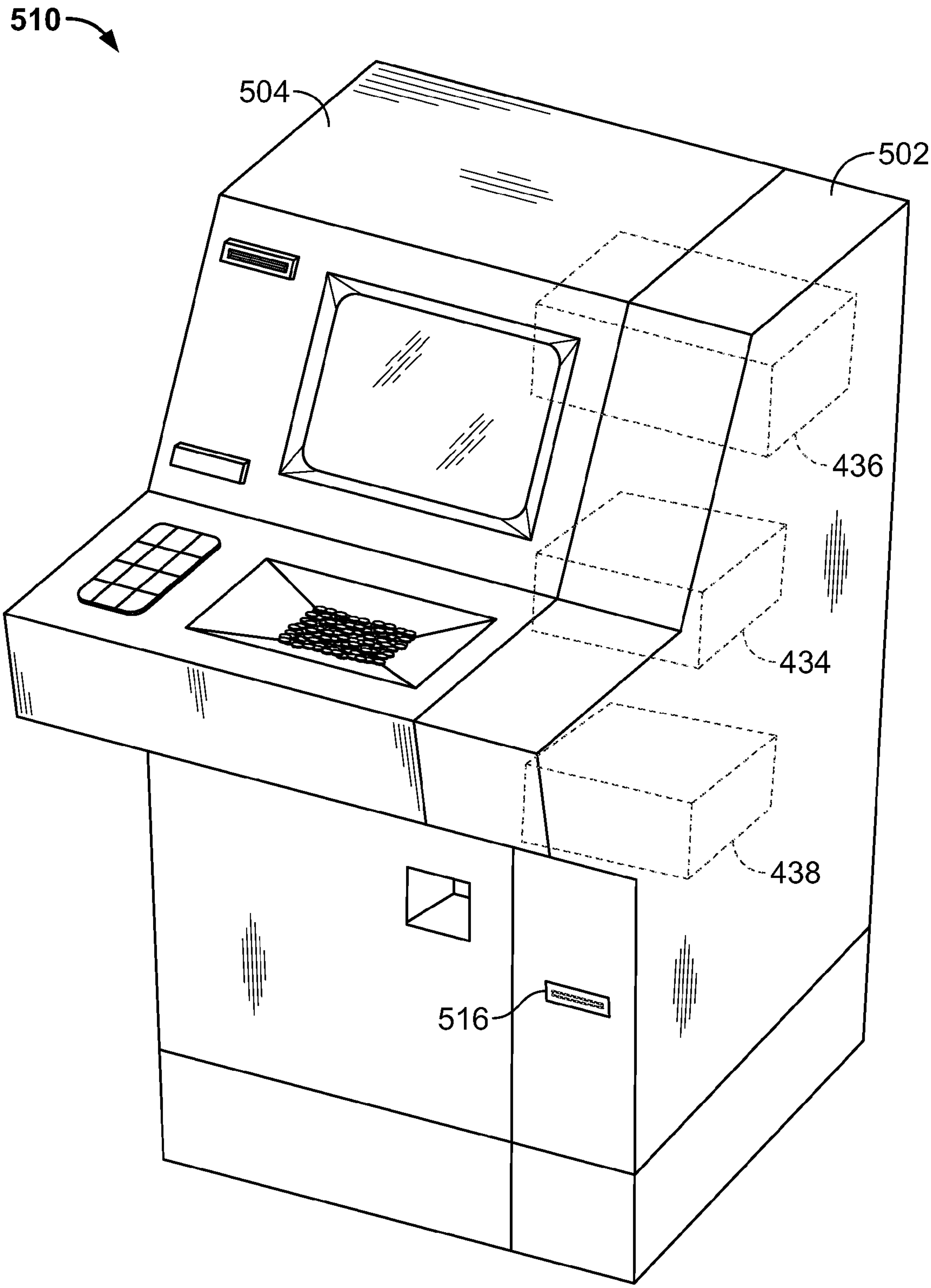
FIG. 8 is a perspective view of a coin redemption machine according to yet another embodiment of the present invention.

FIG. 8 illustrates a coin redemption machine 510 according to another embodiment. According to the illustrated embodiment, the coin redemption machine comprises a card dispensing module 502 and a coin redemption module 504. The coin redemption module 504 may include a funds processing module, user input/outputs devices, and other devices as required. The card dispensing module 502 is an add-on component that is configured to be coupled to an existing coin redemption module 504. The card dispensing module 502 includes a card slot 516, a card stack (not shown), a card printer (not shown), and a card reader/writer device (not shown). The card dispenser module 502 further includes electronic circuitry suitable to couple to and communicate with processors or other circuitry within the coin redemption module 504. Taken together, the card dispenser module 502 and the coin redemption module 504 may include the features of and operate substantially the same as the embodiments previously described with respect to FIGS. 1-7.

It is contemplated that in some embodiments, the card dispensing module 502 may not be located adjacent to the existing coin redemption module 504. Rather, the card dispensing module 502 may be located some distance away from the coin redemption module 504. The coin redemption module 504 and card dispensing module 502 may communicate wirelessly by, for example, near field communications, Bluetooth, Wi-Fi, LAN, or the like. In such embodiments, the card dispensing module 502 may include any suitable means for verifying a user's identity or right to receive the purchased value card before dispensing from the card dispensing module 502. For example, a user may be provided an encrypted alphanumeric code via the touch screen on or a printed receipt from the coin redemption module 504. The user may then enter this code on a user input of the card dispensing module 502 to receive the value card purchased on the coin redemption module 504. As another example, the coin redemption module 504 may print a receipt bearing a barcode, which may be scanned by the card dispensing module 502 before dispensing the value card.

It is further contemplated that in some embodiments, the user may not receive the purchased value card immediately. For example, the user may deposit money, select a card type, and customize a graphic on the coin redemption module 504 and then receive the purchased value card in the mail some time later. In such embodiments, the user generally provides required information including, but not limited to, a mailing address and a phone number using the touch screen.

The embodiments described herein provide numerous additional advantages over previously known coin redemption machines. Namely, the present invention offers limitless varieties of value cards from a machine having only one dispenser and only one type of value card to be stocked. As a result, the machine's footprint is minimized, servicing the machine is less frequent and more efficient, and customers will be attracted to the machine's flexibility and versatility. Moreover, according to many embodiments the burdens on the store or bank hosting the machine are minimized because the value cards are dispensed directly from the machine to the user without any store interaction. Similarly, according to many embodiments, the customer is not inconvenienced by having to wait in lines for a store employee to redeem a voucher or provide a value card.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention, which is set forth in the following alternative embodiments. For example, the aforementioned kiosk or coin redemption module may comprise a stand-alone, non-networked machine configured to print images on cards previously issued to a user so as to permit users to apply their own user-selected graphics to pre-existing cards.

What is claimed:

1. A method of transferring funds to a personalized portable storage medium using a kiosk, comprising the acts of:
- receiving funds comprising a batch of loose mixed coins in a coin receiving area of the kiosk;
- processing the coins in a coin processing module;
- determining a total value of the funds using a controller;
- displaying the total value of the funds to a user of the kiosk;
- permitting the user to select a desired merchant from amongst a plurality of available merchant selections using via a user input device, each merchant being associated with a pre-determined graphic selection;
- receiving a selection of a merchant via a user input device;
- printing, using a printing device, only a graphic associated with the selected merchant on a portable storage medium print area of a portable storage medium, the portable storage medium comprising a storage medium bearing data to which a value relating to the total value is associated; and
- dispensing the portable storage medium bearing only the graphic associated with the selected merchant, the portable storage medium having a first value relating to the total value.

2. A method of transferring funds to a personalized portable storage medium using a kiosk according to claim 1, wherein the portable storage medium comprises a value card associated with the selected merchant.

3. A method of transferring funds to a personalized portable storage medium using a kiosk according to claim 2 wherein the printing area comprises substantially all of a front side of the value card.

4. A method of transferring funds to a personalized portable storage medium using a kiosk according to claim 1, further comprising:
- receiving funds comprising currency bills into a bill processing module;
- transferring the received funds to the dispensed portable storage medium.

5. A method of transferring funds to a personalized portable storage medium using a kiosk according to claim 1, further comprising:
- receiving funds comprising an electronic transfer of funds from an account using a communication device;
- transferring the received funds to the dispensed portable storage medium.

6. A method of transferring funds to a personalized portable storage medium using a kiosk according to claim 1, further comprising:
- receiving a value card in a card reader;
- reading information stored on a storage medium of the value card;
- transferring funds from the value card to the dispensed portable storage medium.

7. A method of transferring funds to a personalized portable storage medium using a kiosk according to claim 1, further comprising:
- transferring funds from a user device having a value associated therewith to the dispensed portable storage medium.

8. A method of transferring funds to a personalized portable storage medium using a kiosk according to claim 7, wherein the user device comprises one of a cell phone, electronic wallet, electronic purse, solid state memory device, or fob.

9. A method of transferring funds to a personalized portable storage medium using a kiosk according to claim 1, further comprising:
- receiving a document comprising a check or a bearer instrument;
- processing the document in a document processing device to determine a value of the document;
- transferring a value of the document to the dispensed portable storage medium.

10. A method of transferring funds to a personalized portable storage medium using a kiosk according to claim 1, wherein the act of processing the document in the document processing device to determine a value of the document comprises reading MICR data, performing OCR, or imaging at least a portion of the document.

11. A method of transferring funds to a personalized portable storage medium using a kiosk according to claim 1, further comprising:
- receiving funds comprising precious metal;
- processing the precious metal using a spectroscopic analyzer to determine a weight and composition thereof; and
- determining a value for the precious metal.

12. A method of transferring funds to a personalized portable storage medium using a kiosk according to claim 1, further comprising:
- assessing a transaction fee.

13. A method of transferring funds to a personalized portable storage medium using a kiosk according to claim 1, further comprising:

dispensing currency bills, coins, or both currency bills and coins when the value of the dispensed portable storage medium is less than a total input value.

14. A method of transferring funds to a personalized portable storage medium using a kiosk according to claim 1, further comprising:

dispensing a check or gift certificate when the value of the dispensed portable storage medium is less than a total input value.

15. A method of transferring funds to a personalized portable storage medium using a kiosk according to claim 1, further comprising:

transmitting information to a remote computer, the information comprising transaction related data.

16. A method of transferring funds to a personalized portable storage medium using a kiosk according to claim 1, further comprising:

transmitting information to a remote computer, the information comprising equipment status information.

17. A kiosk for transferring funds to a personalized portable storage medium, comprising:

a coin receiving area configured to receive a batch of loose mixed coins;

a coin processing module configured, in combination with a controller, to sort the loose mixed coins to determine a total value thereof;

a user-input device;

a display device;

a storage device comprising a plurality of articles of a portable storage medium, each portable storage medium comprising a storage medium bearing data to which a value relating to the total value is associated;

a controller configured, in combination with controller-executable instructions resident in a memory device associated with the kiosk, to cause a display on the display of a plurality of merchants for which a portable storage medium selection are selectively dispensable responsive to a selection of a merchant using the user input device; and a printing device configured to receive a portable storage medium from the portable storage medium storage device, to print on a print area of the portable storage medium only a pre-determined graphic associated with the user-selected merchant, and to dispense the portable storage medium following printing of the pre-determined graphic associated with the user-selected merchant.

18. A kiosk for transferring funds to a personalized portable storage medium according to claim 17, wherein the portable storage medium comprises a value card and wherein the print area of the portable storage medium comprises substantially an entire front surface of the value card.

19. A kiosk for transferring funds to a personalized portable storage medium according to claim 17, further comprising:

a bill processing module configured to receive a currency bill.

20. A kiosk for transferring funds to a personalized portable storage medium according to claim 17, further comprising:

a document processing module configured to receive a document comprising a check or bearer instrument.

21. A kiosk for transferring funds to a personalized portable storage medium according to claim 20, wherein the document processing module is configured to read MICR data, perform OCR, or image at least a portion of the document.

22. A kiosk for transferring funds to a personalized portable storage medium according to claim 17, further comprising:

a card processing module configured to receive a card bearing a storage medium.

23. A kiosk for transferring funds to a personalized portable storage medium according to claim 17, further comprising:

a near field communication device configured to receive value from and transmit value to a cell phone, electronic wallet, electronic purse, solid state memory device, or fob.

24. A kiosk for transferring funds to a personalized portable storage medium according to claim 17, further comprising:

a spectroscopic analyzer configured to analyze a weight and composition of a precious metal.

25. A kiosk for transferring funds to a personalized portable storage medium according to claim 21, further comprising:

at least one storage medium writing device, wherein the controller is further configured, in combination with controller-executable instructions resident in the memory device associated with the kiosk, to cause the storage medium writing device to store, on the storage medium of the dispensed portable storage medium, information corresponding to an accounting system associated with the selected merchant prior to dispensing of the portable storage medium.

26. A kiosk for transferring funds to a personalized portable storage medium, comprising:

a value input device configured to receive value only from a portable electronic storage device;

a user-input device configured to facilitate a transfer of a first value from the portable electronic storage device to the kiosk;

a storage device comprising a plurality of articles of a portable storage medium, each portable storage medium comprising a storage medium configured to store data;

a display device;

a controller configured, in combination with controller-executable instructions resident in a memory device associated with the kiosk, to cause a display on the display of a plurality of merchants for which a portable storage medium selection are selectively dispensable responsive to a selection of a merchant using the user input device; and a printing device configured to receive a portable storage medium from the portable storage medium storage device, to print on a print area of the portable storage medium only a pre-determined graphic associated with the user-selected merchant, and to dispense the portable storage medium following printing, wherein the portable storage medium comprises a value card bearing a magnetic strip or a smart card, and wherein the print area of the portable storage medium comprises substantially an entire front side of the portable storage medium.

27. A kiosk for transferring funds to a personalized portable storage medium according to claim 26, wherein the portable electronic storage device comprises a near field communication device.

28. A kiosk for transferring funds to a personalized portable storage medium according to claim 27, wherein the near field communication device comprises a cell phone, an electronic wallet, or an electronic purse.

29. A kiosk for transferring funds to a personalized portable storage medium according to claim 26, further comprising:

at least one storage medium writing device, wherein the controller is further configured, in combination with controller-executable instructions resident in the memory device associated with the kiosk, to cause the storage medium writing device to store, on the storage medium of the dispensed portable storage medium, information corresponding to an accounting system associated with the selected merchant prior to dispensing of the portable storage medium.

* * * * *